INVENTORS.
LARRY A. GOSHORN
SHERRIL A. HARMON
BY
Ronald W. O'Keefe
ATTORNEY

| DECIMAL NUMBER | EQUIVALENT BINARY NUMBER |
|---|---|
| 0 | 000 |
| 1 | 001 |
| 2 | 010 |
| 3 | 011 |
| 4 | 100 |
| 5 | 101 |
| 6 | 110 |
| 7 | 111 |

FIG. 2

| BIT POSITION | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| BINARY NUMBER | 0 | 1 | 0 | 1 | 1 | 1 | 0 | 0 | 1 | 1 | 1 | 0 | 1 | 0 | 1 | 1 | 0 | 0 | 0 | 1 | 1 | 0 | 0 | 0 |
| EQUIVALENT OCTAL NUMBER | 2 | | | 7 | | | 1 | | | 6 | | | 5 | | | 4 | | | 3 | | | 0 | | |

FIG. 3

| COMMAND TYPE | OPERATION CODE (23 22 21) | OPERATION CODE (20 19 18) | INDEX BIT (17 16 15) | 14 | 13 12 11 10 9 8 7 6 5 4 3 2 1 0 |
|---|---|---|---|---|---|
| FULL OPERAND | | | | * | OPERAND ADDRESS |
| GEN 1 | 0 | 5 | | MICROCODED | |
| GEN 2 | 2 | 5 | | MICROCODED | |
| GEN 3 | 4 | 5 | | MICROCODED | |
| QUASI | 7 | 0-7 | | * | OPERAND ADDRESS |
| STEP FLOATING POINT | 0 | 1 | | MICROCODED | |

* RELATIVE ADDRESSING BIT

FIG. 4

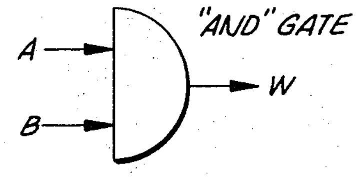
FIG. 8a
"AND" GATE TRUTH TABLE
| A | B | W |
|---|---|---|
| 0 | 0 | 0 |
| 1 | 0 | 0 |
| 0 | 1 | 0 |
| 1 | 1 | 1 |
FIG. 8b
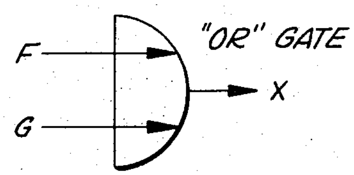
FIG. 9a
"OR" GATE TRUTH TABLE
| F | G | X |
|---|---|---|
| 0 | 0 | 0 |
| 1 | 0 | 1 |
| 0 | 1 | 1 |
| 1 | 1 | 1 |
FIG. 9b
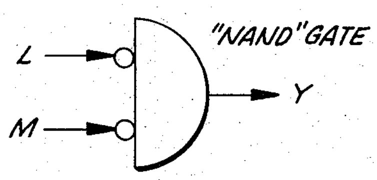
FIG. 10a
"NAND" GATE TRUTH TABLE
| L | M | Y |
|---|---|---|
| 0 | 0 | 1 |
| 0 | 1 | 1 |
| 1 | 0 | 1 |
| 1 | 1 | 0 |
FIG. 10b
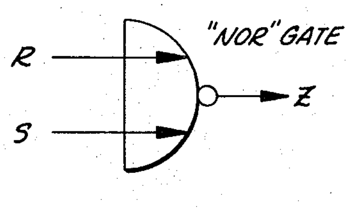
FIG. 11a
"NOR" GATE TRUTH TABLE
| R | S | Z |
|---|---|---|
| 0 | 0 | 1 |
| 1 | 0 | 0 |
| 0 | 1 | 0 |
| 1 | 1 | 0 |
FIG. 11b
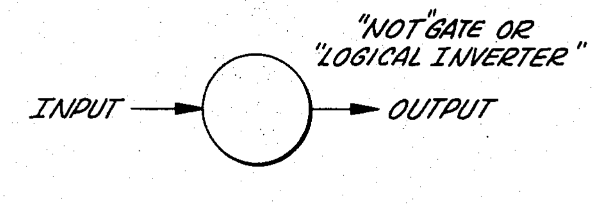
FIG. 12a
"NOT" GATE OR
LOGICAL INVERTER"
TRUTH TABLE
| INPUT | OUTPUT |
|---|---|
| 1 | 0 |
| 0 | 1 |
FIG. 12b

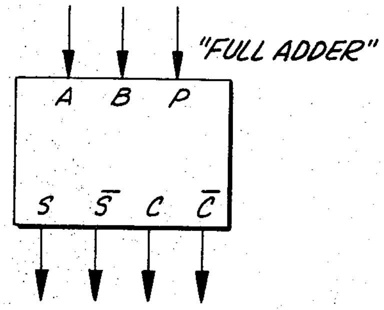
Fig-13a
"FULL ADDER" CHARACTERISTIC TABLE
| A | B | P | S | S̄ | C | C̄ |
|---|---|---|---|---|---|---|
| 0 | 0 | 0 | 1 | 0 | 1 | 0 |
| 0 | 0 | 1 | 0 | 1 | 1 | 0 |
| 0 | 1 | 0 | 0 | 1 | 1 | 0 |
| 0 | 1 | 1 | 1 | 0 | 0 | 1 |
| 1 | 0 | 0 | 0 | 1 | 1 | 0 |
| 1 | 0 | 1 | 1 | 0 | 0 | 1 |
| 1 | 1 | 0 | 1 | 0 | 0 | 1 |
| 1 | 1 | 1 | 0 | 1 | 0 | 1 |
Fig-13b
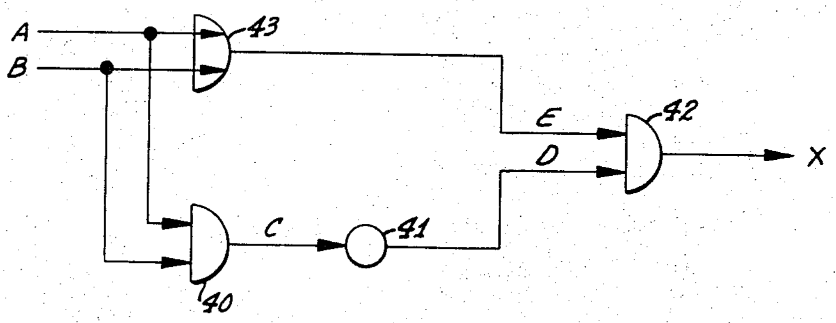
Fig-14
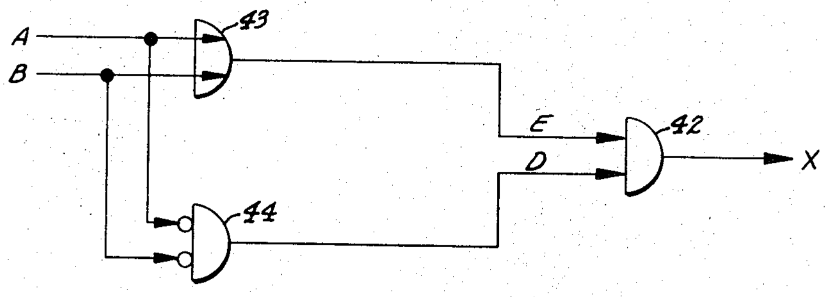
Fig-15

| STATES OF SEQUENCE TIME COUNTER FLIP-FLOPS | | | TIMING SIGNALS WHICH ARE "ONE" | | EQUATIONS FOR THE PULSES WHICH ADVANCE THE TIME COUNTER TO ITS NEXT STATE |
|---|---|---|---|---|---|
| F1TCSA | F1TCSB | F1TCSC | | | |
| 0 | 0 | 0 | TT0E | TCTS | $(\overline{TCSA})(\overline{TCSB})(TCKA)$ |
| 0 | 0 | 1 | TT1E | TCTS | $(\overline{TCSA})(\overline{TCSB})(TCKA)$ |
| 0 | 1 | 0 | TT2E | TCTS | $(TT2E)(TCKA)(CDRA+\overline{MREQ}+IRMS)$ |
| 1 | 1 | 0 | TT3E | TCTA | (TCKA)(TT3E) |
| 1 | 0 | 0 | TT4E | TCTA | (TLPS) |

FIG. 17

NORMAL SEQUENCE CONTROL STATE 1

NORMAL SEQUENCE CONTROL STATE 2

FLOATING-POINT NUMBER

POSITIVE FLOATING-POINT NUMBER

ZERO EXPONENT NUMBER

NEGATIVE FLOATING-POINT NUMBER

Q REGISTER MASK

Oct. 27, 1970 L. A. GOSHORN ET AL 3,536,903

BINARY FLOATING-POINT COMPARING AND SELECTIVE PROCESSING APPARATUS

Filed Dec. 23, 1966 29 Sheets-Sheet 12

$FB00 = FD00\ BDOB + FB01\ BSBL$ $\overline{FB00} = \overline{FB01}\ BSBL + BCLR$ $FB01 = FD01\ BDOB + FB02\ BSBL$ $\overline{FB01} = \overline{FB02}\ BSBL + BCLR$ $FB02 = FD02\ BDOB + FB03\ BSBL$ $\overline{FB02} = \overline{FB03}\ BSBL + BCLR$ $FB03 = FD03\ BDOB + FB04\ BSBL$ $\overline{FB03} = \overline{FB04}\ BSBL + BCLR$ $FB04 = FD04\ BDOB + FB05\ BSBL$ $\overline{FB04} = \overline{FB05}\ BSBL + BCLR$ $FB05 = FD05\ BDOB + FB06\ BSBL$ $\overline{FB05} = \overline{FB06}\ BSBL + BCLR$ $FB06 = FD06\ BDOB + FB07\ BSBU$ $\overline{FB06} = \overline{FB07}\ BSBU + BCLR$ $FB07 = FD07\ BDOB + FB08\ BSBU$ $\overline{FB07} = \overline{FB08}\ BSBU + BCLR$

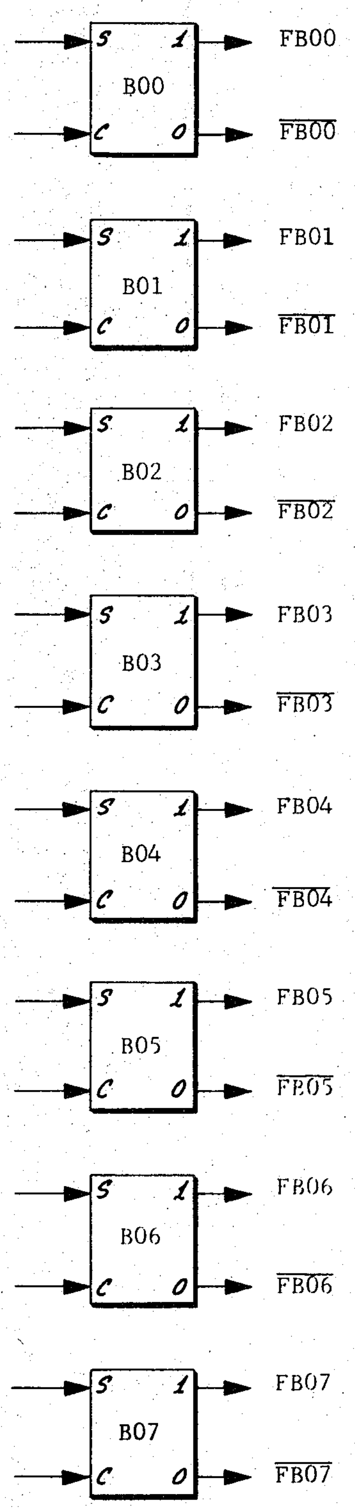

B REGISTER

Fig. 23a

| | |
|---|---|
| FB08 | FD08 BDOB + FB09 BSBU |
| $\overline{FB08}$ | $\overline{FB09}$ BSBU + BCLR |
| FB09 | FD09 BD)B + FB10 BSBU |
| $\overline{FB09}$ | $\overline{FB10}$ BSBU + BCLR |
| FB10 | FD10 BDOB + FB11 BSBU |
| $\overline{FB10}$ | $\overline{FB11}$ BSBU + BCLR |
| FB11 | FD11 BDOB + FB12 BSBU |
| $\overline{FB11}$ | $\overline{FB12}$ BSBU + BCLR |
| FB12 | FD12 BDOB + FB13 BSBU |
| $\overline{FB12}$ | FD12 BDOB + FB13 BSBU |
| FB13 | FD13 BDOB + FB14 BSBU |
| $\overline{FB13}$ | $\overline{FB14}$ BSBU + BCLR |
| FB14 | FD14 BDOB + FB15 BSBU |
| $\overline{FB14}$ | $\overline{FB15}$ BSBU + BCLR |
| FB15 | FD15 BDOB + FB16 BSBU |
| $\overline{FB15}$ | $\overline{FB16}$ BSBU + BCLR |

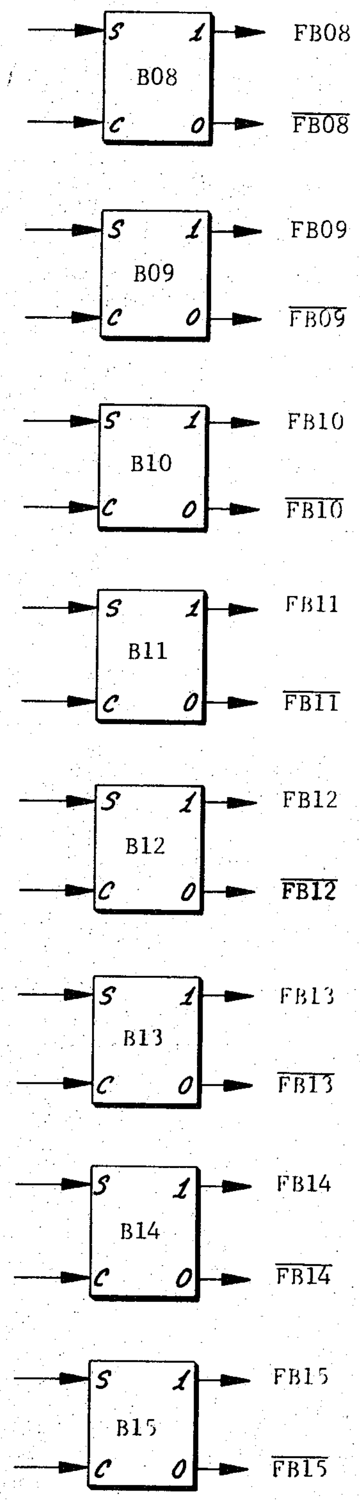

B REGISTER

FIG. 23b

FB16 FD16 BDOB + FB17 BSBU $\overline{FB16}$ $\overline{FB17}$ BSBU + BCLR

FB17 FD17 BDOB + FB18 BSBU $\overline{FB17}$ $\overline{FB18}$ BSBU + BCLR

FB18 FD18 BDOB + FB19 BSBU $\overline{FB18}$ $\overline{FB19}$ BSBU + BCLR

FB19 FD19 BDOB + FB20 BSBU $\overline{FB19}$ $\overline{FB20}$ BSBU + BCLR

FB20 FD20 BDOB + FB21 BSBU $\overline{FB20}$ $\overline{FB21}$ BSBU + BCLR

FB21 FD21 BDOB + FB22 BSBU $\overline{FB21}$ $\overline{FB22}$ BSBU + BCLR

FB22 FD22 BDOB + FB23

$\overline{FB22}$ $\overline{FB23}$ BSBU + BCLR

FB23 FD23 BDOB + FAFS BSBU $\overline{FB23}$ $\overline{FAFS}$ BSBU + BCLR

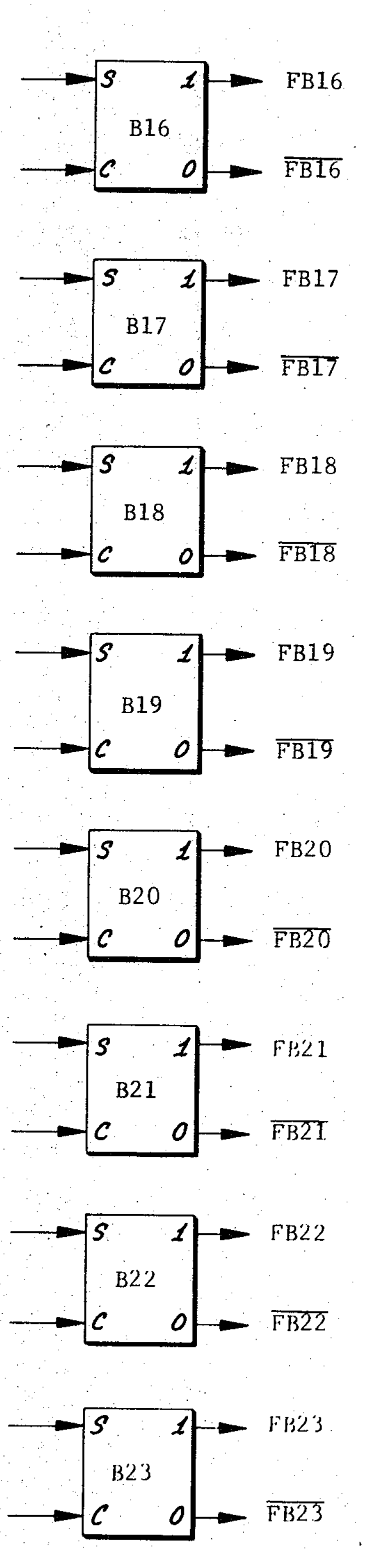

B REGISTER

Fig. 23c

PARALLEL ADDER UNIT

PARALLEL ADDER UNIT

A REGISTER

A REGISTER

A REGISTER

Q REGISTER

Oct. 27, 1970 L. A. GOSHORN ET AL 3,536,903

BINARY FLOATING-POINT COMPARING AND SELECTIVE PROCESSING APPARATUS

Filed Dec. 23, 1966 29 Sheets-Sheet 22

FQ08 · FQ09 QSRQ $\overline{FQ08}$ · $\overline{FQ09}$ QSRQ

FQ09 · FQ10 QSRQ $\overline{FQ09}$ · $\overline{FQ10}$ QSRQ

FQ10 · FQ11 QSRQ $\overline{FQ10}$ · $\overline{FQ11}$ QSRQ

FQ11 · FQ12 QSRQ $\overline{FQ11}$ · $\overline{FQ12}$ QSRQ

FQ12 · FQ13 QSRQ $\overline{FQ12}$ · $\overline{FQ13}$ QSRQ

FQ13 · FQ14 QSRQ $\overline{FQ13}$ · $\overline{FQ14}$ QSRQ

FQ14 · FQ15 QSRQ $\overline{FQ14}$ · $\overline{FQ15}$ QSRQ

FQ15 · FQ16 QSRQ $\overline{FQ15}$ · $\overline{FQ16}$ QSRQ

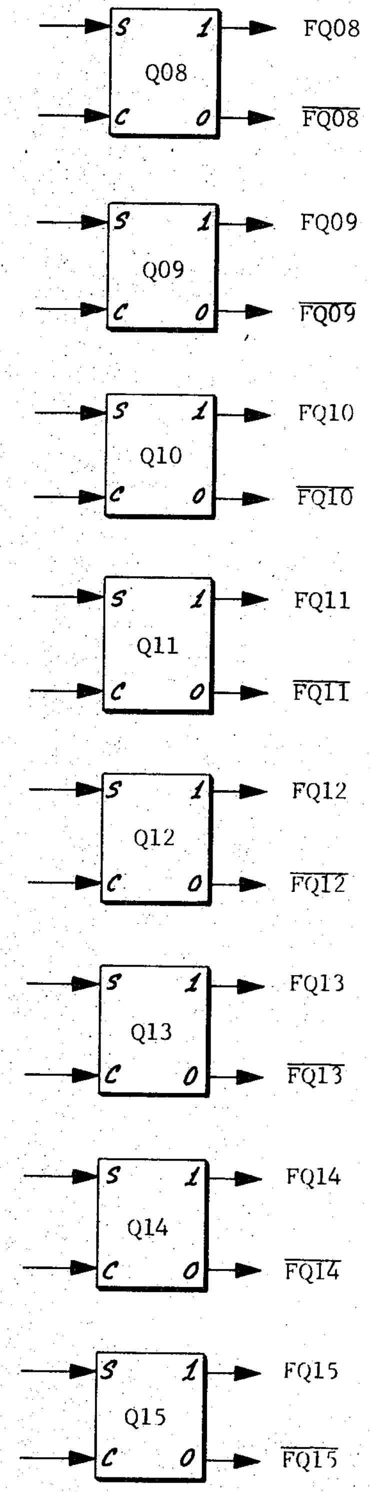

Q REGISTER

Fig-27b

Q REGISTER

FJ00 = $\overline{FA17}$ JNAJ + $\overline{FJ00}$ JINC $\overline{FJ00}$ = FJ00 JINC + JCLR FJ01 = $\overline{FA18}$ JNAJ + $\overline{FJ01}$ FJ00 JINC $\overline{FJ01}$ = FJ01 FJ00 JINC + JCLR FJ02 = $\overline{FA19}$ JNAJ + $\overline{FJ02}$ FJ01 FJ00 JINC $\overline{FJ02}$ = FJ02 FJ01 FJ00 JINC + JCLR FJ03 = $\overline{FA20}$ JNAJ + $\overline{FJ03}$ FJ02 FJ01 FJ00 JINC $\overline{FJ03}$ = FJ03 FJ02 FJ01 FJ00 JINC + JCLR FJ04 = $\overline{FA21}$ JNAJ
+$\overline{FJ04}$ FJ03 FJ02 FJ01 FJ00 JINC $\overline{FJ04}$ = FJ04 FJ03 FJ02 FJ01 FJ00 JINC + JCLR

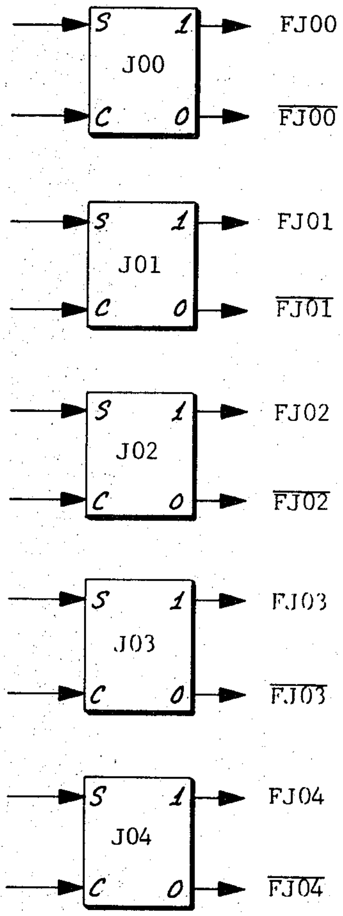

J COUNTER

FIG. 28

"F" FULL ADDER

"F" CARRY FLIP-FLOP

REMEMBER FLIP-FLOP

TEST FLIP-FLOP

| | |
|---|---|
| DGN3 TT2E SC4A (FI12 + FI13) | = ACLR |
| DGN3 SC1A FI12 TTOE | = AJNA |
| DGN3 FI10 TCKA TS4S $(\overline{FI12\ FA16})$ $(\overline{FJ00}+\overline{FJ01}+\overline{FJ02}+\overline{FJ03}+\overline{FJ04})$ | = ASLA |
| DSFP TCKA TS4S + DGN3 $\overline{FI10}$ TCKA TS4S $(\overline{FJ00}+\overline{FJ01}+\overline{FJ02}+\overline{FJ03}+\overline{FJ04})$ | = ASRA |
| CLEAR B REGISTER BEFORE EACH MEMORY READ OPERATION | = BCLR |
| CDRA TCKA TT2E | = BDOB |
| DSFP TCKA TS4S | = BSBL |
| DSFP TCKA TS4S | = BSBU |
| MEMORA DATA AVAILABLE IN MEMORY DATA REGISTER | = CDRA |
| TCT2 SC1A + TLPS (SC1A + SC2A) | = HAUH |
| (SC1A + SC2A) TLPS | = IAUI |
| DGN3 (SC1A + SC2A) TCT3 | = JCLR |
| TT4E DGN3 SC4A TCKA $[(\overline{FA16}+\overline{FI12})(\overline{FJ00}+\overline{FJ01}+\overline{FJ02}+\overline{FJ03}+\overline{FJ04})]$ | = JINC |
| DGN3 (SC1A + SC2A) (DS13 + DS14) TLPS | = JNAJ |
| SC1A | = MAMP |
| DSFP (SC3A + SC4A) | = MAM2 |
| DATA REQUESTED FROM MEMORY | = MREQ |
| DSFP FRMM FI10 SC4A TLPS + SC4A DGN3 FA16 FI12 TLPS + DGN3 FA22 FI13 TCT2 SC4A + DGN3 FA17 FI14 TCT2 SC4A | = PAUP |
| TLPS SC1A | = PXHP |
| DSFP TCKA TS4S | = QSRQ |
| SC4A TCTA | = TAS4 |
| TT2E TCKA (CDRA + $\overline{MREQ}$) | = TCT2 |
| TAFF TBFF $\overline{TCFF}$ | = TDCC |
| DGN3 TS4S TCKA FI12 FA16 + FJ00 FJ01 FJ02 FJ03 FJ04 | = TLPS |
| SC4A TT4E $\overline{TDCC}$ | = TS4S |
| (TTOE TCKA) | = TTOB |
| DSFP SC3A TCTA | = UAAU |
| (SC1A + SC2A) TCTA | = UBLA |
| DSFP SC3A TCTA | = UBNA |
| UPAU + TCTA SC3A DSFP | = UENC |
| TCTS SC1A + DSFP TAS4 + SC4A DGN3 | = UPAU |

MISCELLANEOUS LOGIC AND GATING SIGNALS

FIG. 33

SFP COMMAND WORD

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| 0 | | | 1 | | | X | | | • | | | | • | • | • | • | • | • | • | NOT USED | | | |

"F" FULL ADDER INPUT CONTROL

| 14 | 13 | 12 | 11 | FQ00 | FUNCTION |
|---|---|---|---|---|---|
| 1 | | | | 1 | FA00 → A INPUT |
| 1 | | | | 0 | 0 → A INPUT |
| | 1 | | | 1 | 0 → A INPUT |
| | 1 | | | 0 | FA00 → A INPUT |
| | | 1 | | 1 | $\overline{FB00}$ → B INPUT |
| | | 1 | | 0 | FB00 → B INPUT |
| | | | 1 | 1 | FB00 → B INPUT |
| | | | 1 | 0 | 0 → B INPUT |

JUMP CONTROL

| 10 | FUNCTION |
|---|---|
| 1 | IF FRMM → P+2<br>IF $\overline{FRMM}$ → P+1 |
| 0 | P+1 |

TEST F/F CONTROL

| 9 | FUNCTION |
|---|---|
| 1 | IF FA23 + FB23 = 1 → FTST |
| 0 | FTST UNCHANGED |

A<B TEST

| 8 | FUNCTION |
|---|---|
| 1 | ENTER SEQUENCE STATE 3 AND PERFORM PARALLEL SUBTRACTION OF B FROM A PRIOR TO SHIFT. SET RMM IF A<B |
| 0 | SKIP SEQUENCE STATE 3 |

REMEMBER F/F CONTROL OF "F" FULL ADDER INPUTS

| 7 | FRMM | FQ00 | FUNCTION |
|---|---|---|---|
| 1 | 1 | 1 | $\overline{FA00}$ → A INPUT*<br>FB00 → B INPUT |
| 1 | 1 | 0 | FA00 → A INPUT<br>0 → B INPUT |
| 1 | 0 | 1 | FA00 → A INPUT<br>$\overline{FB00}$ → B INPUT* |
| 1 | 0 | 0 | 0 → A INPUT<br>FB00 → B INPUT |

F CARRY CONTROL

| 4 | FUNCTION |
|---|---|
| 1 | PRESET FCF |
| 0 | NORMAL CARRY |

REMEMBER F/F CONTROL

| 5 | FUNCTION |
|---|---|
| 1 | SET RMM IF A "CARRY" OUT OF THE FIELD EXISTS. |
| 0 | RMM NOT CHANGED DURING SHIFT |

A23 CONTROL

| 6 | FUNCTION |
|---|---|
| 1 | FB23 "OR" TO FA23 PRIOR TO FIRST SHIFT |

* IF BIT 4=1 THEN SERIAL SUBTRACTION OF EXPONENTS OCCURS [i.e. ($\bar{A}$+1)+B=B-A → A REGISTER OR ($\bar{B}$+1)+A=A-B → A REGISTER].

MICROCODED CONTROL BITS OF SFP COMMAND

FIG. 34

TIMING DIAGRAM: STEP FLOATING-POINT COMMAND 3,536,903
BINARY FLOATING-POINT COMPARING AND SELECTIVE PROCESSING APPARATUS

Larry A. Goshorn, Villa Park, Calif., and Sherril A. Harmon, Phoenix, Arizona, assignors to General Electric Company, a corporation of New York Filed Dec. 23, 1966, Ser. No. 604,223
Int. Cl. G06f 7/50
U.S. Cl. 235—168 6 Claims

ABSTRACT OF THE DISCLOSURE

Apparatus is provided for expeditiously processing binary floating-point numbers. A first register is provided for storing a first floating-point number, and a second register is provided for storing a second floating-point number, each floating-point number having an exponent field and a mantissa field. An auxiliary register is provided for storing first and second mask fields corresponding to the exponent and mantissa fields, respectively, of a floating-point number. The first and second floating-point numbers are subtracted in an arithmetic unit, the state of a control flip-flop being responsive to the result of the subtraction to indicate which of the floating-point numbers is larger. The binary digits of the first and second floating-point numbers and the corresponding binary digits in the auxiliary register are applied in sequence to a full adder, the full adder being responsive to the state of the control flip-flop to cause the mantissa field of the smaller floating-point number and the result of an arithmetic operation performed on the exponent field of the two floating-point numbers to be stored in one of the registers.

BACKGROUND OF THE INVENTION

This invention relates to information processing apparatus and, in particular, to apparatus for processing binary floating-point numbers.

In a data processing system, numbers may be represented in either fixed-point or floating-point notation. In fixed-point notation, all numbers are represented on the same scale with the location of the decimal point indicating the size of the number. The number of digits to the left and right of the decimal point is determined by the range of numbers of interest for the information being represented. Where the range of numbers dealt with is predictable, fixed-point notation is convenient.

In applications involving a wide range of numbers or applications wherein the size of the numbers to be handled is not predictable, floating-point notation is advantageous. A floating-point number comprises two portions, one portion indicating the magnitude of the number and the other portion indicating the exact size of the number within the range defined by the first portion. These two portions of the number are called, respectively, the exponent and the mantissa. The exponent describes the order of magnitude, i.e. the power to which the radix or base of the number is to be raised; the mantissa describes the number within that range. Together, the mantissa and exponent define a given number. The range of possible exponents may be made large enough to accommodate the wide range of numbers which may occur in a given problem.

In programming a digital computer to perform fixed-point arithmetic operations, the programmer must scale the numbers used in the computation. The scale factors must be remembered by the programmer so that intermediate results do not exceed the capacity of the register involved and so that the numbers are not positioned so far to the right in the registers that precision is lost. In floating-point operations, the numbers are automatically scaled while the calculation is performed. Both the result of the calculation and the scale factor of the result are specified following the calculation. This is especially advantageous when the numbers used in the calculations vary over a wide range of magnitudes.

In performing arithmetic operations on floating-point numbers, viz. addition and subtraction, it is necessary to determine which of the floating-point numbers is the larger. The smaller of the two floating-point numbers is then stored for subsequent processing. In floating-point subroutines, many instructions are normally provided to perform the comparison of the floating-point numbers and the selection and storage of the smaller floating-point number, requiring a relatively large amount of processing time and memory storage space. Accordingly, it is desirable to increase the efficiency of this operation.

SUMMARY

It is therefore an object of this invention to provide improved apparatus for performing floating-point operations in a data processing system.

It is another object of this invention to provide improved apparatus for determining the larger of two floating-point numbers and for storing the smaller floating-point number in a register.

It is another object of this invention to provide improved comparison and transfer apparatus for performing floating-point arithmetic operations.

It is a further object of this invention to provide more efficient apparatus for providing floating-point comparison and transfer operations.

The foregoing objects are achieved, in accordance with the illustrated embodiment of the invention by providing arithmetic apparatus for subtracting a first floating-point number in one register from a second floating-point number in another register, the result of the subtraction being utilized to determine the state of a control flip-flop. The control flip-flop is set to the 1-state if the first floating-point number is the larger or is reset to the 0-state if the second floating-point number is the larger. Transfer apparatus is provided for sequentially applying the binary digits of the mantissas of the first and second floating-point numbers in the registers to first and second input gates respectively of a serial full adder. The output signals of the control flip-flop, representing the state of the control flip-flop, are also applied to the first and second input gates of the full adder, enabling the first input gate of the full adder if the floating-point number in the second register is the larger or enabling the second input gate of the full adder if the floating-point number in the first register is the larger. Transfer means are provided for storing the output of the full adder, comprising the binary digits of the mantissa of the smaller floating-point number, in A registers.

Floating-point arithmetic operations often require that either the exponent or the mantissa of a floating-point number be processed without affecting the other part of the number. This may be accomplished by transferring the other part of the floating-point number to another register while performing the desired operation on the one portion. Such transfers increase the processing time required for floating-point operations. Accordingly, it is desirable to perform an operation on one part of a floating-point number in a register while retaining the other portion of the number in the same register.

It is therefore an object of this invention to provide improved apparatus for processing floating-point numbers.

It is another object of this invention to provide improved apparatus for performing an operation on one of two portions of a floating-point number.

It is a further object of this invention to provide apparatus for receiving both parts of a floating-point number and for performing an operation on only a selected part of the floating-point number.

The foregoing objects are achieved, in accordance with the illustrated embodiment of the invention by providing a first register for storing a first floating-point number and a second register for storing a second floating-point number, each floating-point number having an exponent field and a mantissa field. An auxiliary register is provided for storing first and second fields corresponding to the exponent and mantissa fields respectively of a floating-point number, the first field comprising binary digits of one type and the second field comprising binary digits of a second type. A full adder is provided for performing arithmetic operations on numbers applied to input gates of the full adder. The floating-point numbers in the first and second registers are synchronously shifted out of the registers, corresponding binary digits of the two floating-point numbers being simultaneously applied to the input gates of the full adder. The contents of the auxiliary register are also shifted, the output bits of the auxiliary register being applied to the input gates of the full adder simultaneous with the corresponding bits of the first and second floating-point numbers. The second field of the auxiliary register in conjunction with a control flip-flop inhibits predetermined input gates so that the mantissa field of one of the floating-point numbers is transferred unchanged through the full adder and stored in the second register. The first field of the auxiliary register enables predetermined input gates of the full adder to permit performance of an arithmetic operation on the exponent fields of the first and second floating-point numbers in the full adder, the result of the arithmetic operation being stored in the second register along with the previously-stored mantissa field.

BRIEF DESCRIPTION OF THE DRAWINGS

FIG. 2 is a table showing the relationship between decimal numbers and binary numbers;

FIG. 3 is a table showing the relationship between binary numbers and octal numbers with reference to a word comprising twenty-four binary digits;

FIG. 4 is a symbolic diagram illustrating the format of the various command words employed in the system of FIG. 1;

FIG. 8*a* is a logic symbol for an AND gate, and FIG. 8*b* is a truth table for the AND gate of FIG. 8*a*;

FIG. 9*a* is a logic symbol for an OR gate, and FIG. 9*b* is a truth table for the OR gate of FIG. 9*a*;

FIG. 10*a* is a logic symbol for a NAND gate, and FIG. 10*b* is a truth table for the NAND gate of FIG. 10*a*;

FIG. 11*a* is a logic symbol for a NOR gate, and FIG. 11*b* is a truth table for the NOR gate of FIG. 11*a*;

FIG. 12*a* is a logic symbol for a NOT gate or logical inverter, and FIG. 12*b* is a truth table for the NOT gate or logical inverter of FIG. 12*b*;

FIG. 13*a* is a logic symbol for a serial full adder, and FIG. 13*b* is a characteristic table for the serial full adder of FIG. 13*a*;

FIG. 14 is a logic diagram of a logic network which performs an Exclusive OR function;

FIG. 15 is a logic diagram of an alternative logic network which performs an Exclusive OR function;

FIG. 17 is a table showing the relationship between three flip-flops comprising a Sequence Time Counter in the timing logic area, the signals which issue from the Sequence Time Counter, and the logic equations of signals which advance the Sequence Time Counter from one state to the next;

FIGS. 23*a*–23*c* are flip-flop logical schematic diagrams of the B Register employed in the system of FIG. 1;

FIGS. 27*a*–27*c* are flip-flop input logical schematic diagrams of the Q Register employed in the system of FIG. 1;

FIG. 28 comprises flip-flop input logical schematic diagrams of the J Counter employed in the system of FIG. 1;

FIG. 33 comprises logical combination signal diagrams illustrating the structure which generates the designated logic and gating signals employed in the system of FIG. 1;

FIG. 34 is a symbolic diagram illustrating the organization of the command word which controls the apparatus of the invention.

DESCRIPTION OF AN ILLUSTRATIVE EMBODIMENT

Process computer system

Figure 1:
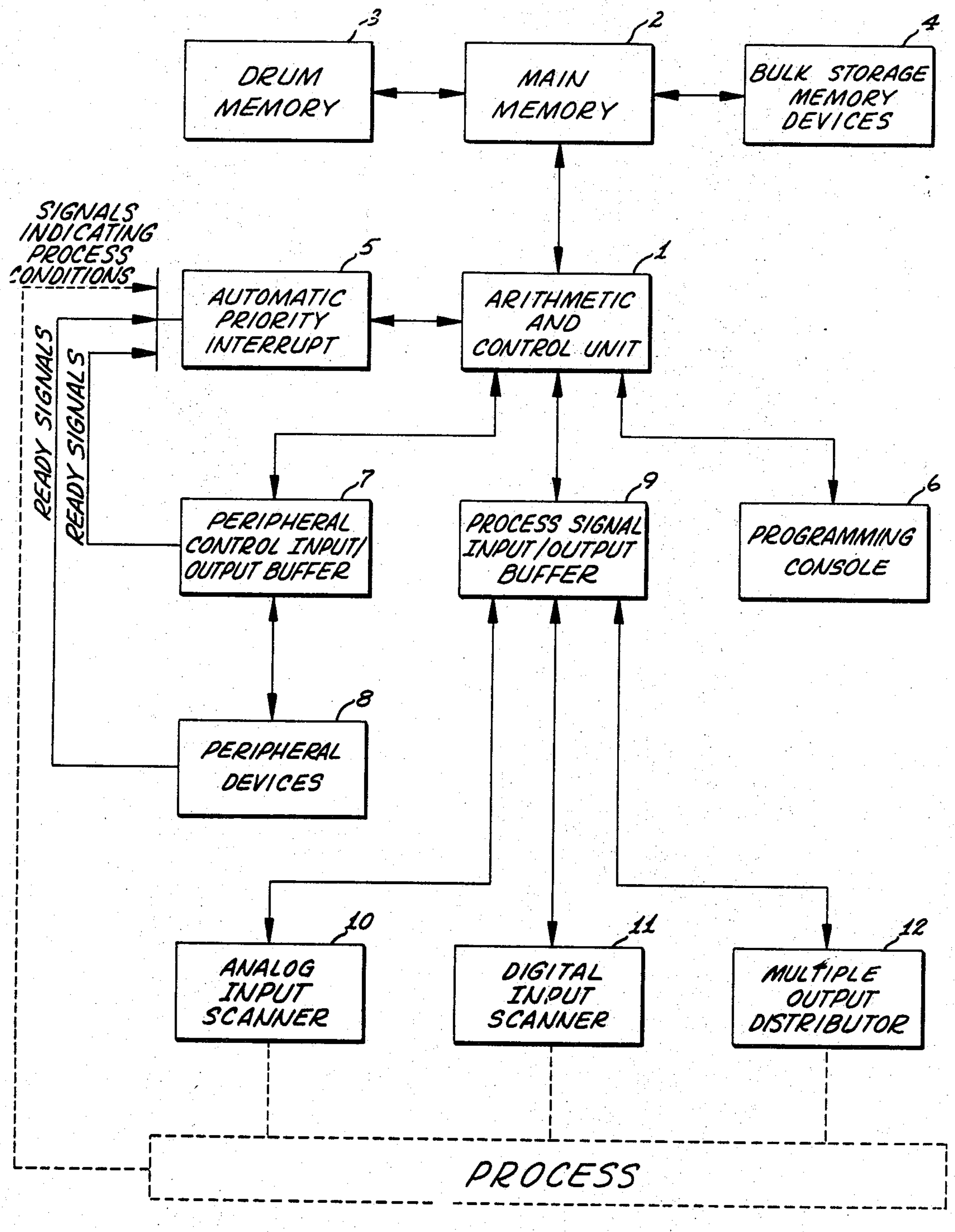
FIG. 1 is a block diagram of an information processing system to which the instant invention is applicable.

A diagram showing the organization of a process computer system and its relationship to a controlled or monitored process is presented in FIG. 1. An Arithmetic and Control Unit 1 performs calculations and other logical operations and also sequences and distributes information throughout the system. It supplies information to and receives information from a Main Memory module 2, an Automatic Priority Interrupt module 5, a Programming Console 6, a Pheripheral Control Input-Output Buffer module 7, and a Process Signal Input/Output Buffer module 9.

The Main Memory module 2 typically and in this case contains a random access core storage characterized by its high speed capability. Appropriate control circuitry is provided to permit interchange of information with the Arithmetic and Control Unit 1, a Drum Memory 3, and such additional Bulk Storage Memory Devices 4 as may be required for a given system.

The Drum Memory 3 is a backup storage device for the Main Memory 2. It holds instruction routines and data which can be transferred into the Main Memory 2 upon demand. The Bulk Storage Memory Devices 4 are typically magnetic disk random access storage units and/or magnetic tape storage units used for massive storage of information to which the Arithmetic and Control Unit 1 need not have high speed access but which can be transferred into Main Memory 2 upon demand as may be required.

The Automatic Priority Interrupt module 5 detects and identifies "ready" signals from Peripheral Devices 8 that require testing at relatively long time intervals. A "ready" signal from a peripheral device indicates that it is physically ready to perform its normal function. For example, if a typewriter is "ready" to type, its power is on, its motor is up to speed, and it will have completed any previous request to type a character, i.e., the physical operations which occur within the typewriter to type a character will have been completed so that another character can be typed if required. The Automatic Priority Interrupt module is also used to detect signals which indicate condition changes in the controlled or monitored process. When an interrupt signal is detected, the Arithmetic and Control Unit 1 is alerted, and a program subroutine is initiated at an appropriate time by a program branch to a memory address supplied by the Automatic Priority Interrupt module to service the requesting interrupt according to its relative importance.

The Process Signal Input/Output Buffer module 9 is a communications link between the Arithmetic and Control Unit 1 and the controlled and/or monitored process input and output devices. It acts as a multiplexer for digital and analog inputs and as a multiplexer and amplifier for output signals. Signal inputs may be from contact closures, pulse generators, or measuring devices. The Arithmetic and Control Unit 1 uses the logic and equations stored in Main Memory 2 to decide whether any control or alarm actions are required. If corrective or alarm action is needed, the Arithmetic and Control Unit 1 provides the necessary information through the Process Signal Input/Output Buffer 9 to the digital and/or analog output circuits to change the process control variables or activate the proper alarm devices or displays. A plurality of Process Signal Input/Output Buffer modules may be provided to communicate with a single Arithmetic and Control Unit where the requirements of a specific system exceed the capacity of a single Process Signal Input/Output Buffer module.

The Analog Input Scanner 10 selects and amplifies process analog sensor signals. It also converts analog information into a digital form compatible with that used within the Arithmetic and Control Unit 1 and the other system modules. The Digital Input Scanner module 11 selects and conditions (filters, amplifies, attenuates) contact or digital process inputs. The Multiple Output Distributor module 12 selects and times digital, decimal, and analog outputs to the controlled and/or monitored process and to operator displays.

The Peripheral Control Input/Output Buffer module 7 communicates with the Arithmetic and Control Unit 1 and is used as a data buffer, translator, and sequencer for the various Peripheral Devices 8, which may include such Input/Output devices as typewriters, paper tape and card readers and punches, etc. A plurality of Peripheral Control Input/Output Buffer modules may be provided to communicate with a single Arithmetic and Control Unit where the requirement of a specific system exceed the capacity of a single Peripheral Control Input/Output Buffer.

The Programming Console 6 provides manual communications with the Arithmetic and Control Unit 1 in machine language for programming and maintenance. In addition, the Programming Console 6 is provided with light displays which show the instantaneous states of various registers and elements within the Arithmetic and Control Unit 1 as an aid to monitoring the system and program performance and condition.

Information representation

The process computer system of FIG. 1 stores and processes information represented by the binary code in which each digit must be a "one" or a "zero." For a brief explanation of this now commonly used code, one may refer to chapter 1 of Digital Computer Design Fundamentals by Yaohan Chu, published in 1962 by the McGraw-Hill Publishing Company, Inc. The fundamental unit of information employed in the particular system described is a word of 24 binary digits. The first binary digit or bit of a word is termed the most significant bit and is designated as bit 23. The last binary digit is termed the least significant bit of the word and is designated as bit 0. The binary digits between bits 23 and 0 are accorded successively decreasing orders of significance.

Three general categories of words are employed in the system; viz.: (1) data words, (2) command words, and (3) auxiliary words for addressing and control. For convenience a binary word may be more compactly represented by a series of "octal" digits in which each octal digit defines 3 adjacent binary digits. As illustrated in FIG. 2, any decimal number between zero and seven may be represented by three binary digits so that there are eight total combinations possible, hence the designation "octal." FIG. 3 illustrates a 24-bit word and the equivalent octal number which represents the binary word given as an example. As will be explained below, the operation codes of the various types of command words are defined by bits 23–18 of the command words. The operation codes may therefore be denoted by two octal digits. A subscript 8 placed after a number indicates octal notation. A subscript 10 placed after a number indicates decimal notation.

The Main Memory module 2 of FIG. 1 may utilize storage elements of the coincident-current magnetic core type. A brief explanation of magnetic core storage can be found at pages 106, 107, and 108 of Digital Computer Primer by E. M. McCormick, published in 1959 by the McGraw-Hill Book Company, Inc. For this specification, it need only be observed that words stored in the Main Memory module 2 are individually identified by a binary number which represents the address of a specific core cell or storage location in a three-dimensional magnetic core matrix where a desired information word, command word, or control word is stored. If the appropriate binary identification number or address is supplied to the Main Memory module 2, the Memory circuitry can retrieve or "fetch" the designated 24-bit word from the magnetic core storage location and make it available to the Arithmetic and Control Unit 1. The extraction of a previously stored information word from a core memory may change the magnetic state of individual cores and so destroy the information stored therein. Normal practice in the art is to provide automatic apparatus which immediately restores the same binary word in the same Memory core cell or storage location from which it has been fetched so that, in effect, extracting information form a Memory storage location does not change the information stored there.

Memory storage location addresses are often specified in octal notation. For example, the Memory storage location address 01110110101110 is more compactly identified as $16656_8$. It will be observed that, in this example, the binary number is 14 bits in length. For this reason, the most significant octal digit can never be higher than 3.

If the binary number had been 13 bits in length, the most significant octal digit could never have been higher than 1. This follows from the conventional practice of dividing the binary word into octal digits by grouping from the least significant to the more significant bits.

The command or instruction words executed by the Arithmetic and Control Unit 1 are divided into six categories: Operand, GEN 1, GEN 2, GEN 3, Quasi, and Step Floating Point (SFP). The format of each of these command types is shown in FIG. 4. As noted above, the operation codes for all commands are defined by the six most significant bits (23–18) of the command words. The operation code identifies the specific effect to be brought about by the performance of a command or instruction.

Full Operand commands are the most commonly used. These commands, a subcategory of Operand commands, are used to perform arithmetic operations, logical operations, index control operations, and data transfers to and from the Main Memory module 2. Bits 13–0 of these command words, the operand address portion, designate the address of the storage location in the Main Memory 2 containing information which is to be used or affected by executing the command. Bit 14 of the Full Operand command words, if a "one" brings about a modification to the operand address known as Relative Addressing which will be described below.

GEN 1 commands are differentiated from other command types by their unique operation code $05_8$. These commands are further sub-divided by the microcoding of bits 14–0 of the command word. GEN 1 commands are used primarily to effect bit manipulation within the principal accumulator register of the Arithmetic and Control Unit 1.

GEN 2 commands are differentiated from other commands by their unique operation code $25_8$. These commands are also sub-divided by the microcoding of bits 14–0 of the command word. GEN 2 commands are employed within the system to: (1) select modules and devices in the input/output equipment, (2) transfer data to or from these devices, and (3) provide for program control transfers as determined by various internal and external conditions to which the system is responsive.

GEN 3 commands are differentiated from other commands by their unique operation code $45_8$. These commands are also sub-divided by the microcoding of the bits 14–0 of the command word. GEN 3 commands are used to manipulate the contents of the principal and secondary accumulator registers and to affect other elements within the Arithmetic and Control Unit 1. GEN 3 commands are also used within Quasi subroutines foi speeding up floating point arithmetic operations.

Quasi commands are identified by the presence of the number $7_8$ in bit positions 23 through 21 of the command word. These commands are utilized to initiate Quasi subroutines which perform floating point arithmetic operations or other recurring special functions. The Main Memory 2 address of the first command word in a Quasi subroutine is defined within the operation code of the appropriate Quasi command.

SFP (Step Foating Point) commands are identified by their unique operation code $01_8$. They are used within the Quasi subroutines to implement and speed up floating point arithmetic operations. Bits 14–0 of the command words are microcoded to bring about bit manipulations within the Arithmetic and Control Unit 1 of unique significance to the performance of floating point operations.

Bits 17–15 of all command words, denoted the X, or index, bits, are reserved for indicating whether conventional index modification is to be performed on a command before its execution and, if index modification is specified, which index cell contains the modifying or index quantity which is to be the modifier. If bits 17–15 of a command word are all "zeros," no index modification will occur when the command word is transferred to the Arithmetic and Control Unit 1 for execution. If bits 15–17 are any other possible combination (001–111), index modification of the command word will take place by causing the contents of the designated Memory storage location ($00001–00007_8$) to be added to bit positions 15–0 of the command word. With the most often used command type, Full Operand, the result is normally a change in the operand address portion of the command word. With other command types, however, the command microcoding, and hence the operation to be performed, can be affected by index modification.

Where the total possible number of words which may be stored in the Main Memory module 2 exceeds the definition capability of that part (bits 13–0) of the Full Operand command words which specifies the operand address, a unique form of addressing is utilize to achieve extended addressing capability without increasing the fundamental word length of the information processing system. Bit 14 of Full Operand command words is reserved for specifying whether or not Relative Addressing is to be used with a command word which has been called into the Arithmetic and Control Unit 1 for execution. If bit 14 is a "one," Relative Addressing is specified, and the operand address portion of the command word will be modified arithmetically according to certain defined rules before it is executed such that the total range of addressable storage locations in the Main Memory module 2 is four times as great as that which could be specified by bits 13–0 without the relative addressing capability. If bit 14 is a "zero," Relative Addressing is not utilized, and the command word operand address is that specified directly by bits 13–0 subject to index modification as noted above.

Quasi command words can also be Relative Addressed although the result is not the same as that achieved with Full Operand command words. When a Quasi command word is executed and program control is transferred to the Memory storage location specified by the Quasi command word operation code portion, the binary number contained within the operand address portion is automatically transferred to a predetermined Memory storage location from which it can be extracted for use within the Quasi subroutine if necessary. When a Quasi command word is "Relative Addressed," the ultimate result is a change in the binary number placed into the predetermined Memory storage location rather than an actual change in an operand address per se.

Arithmetic and control unit

Figure 5:
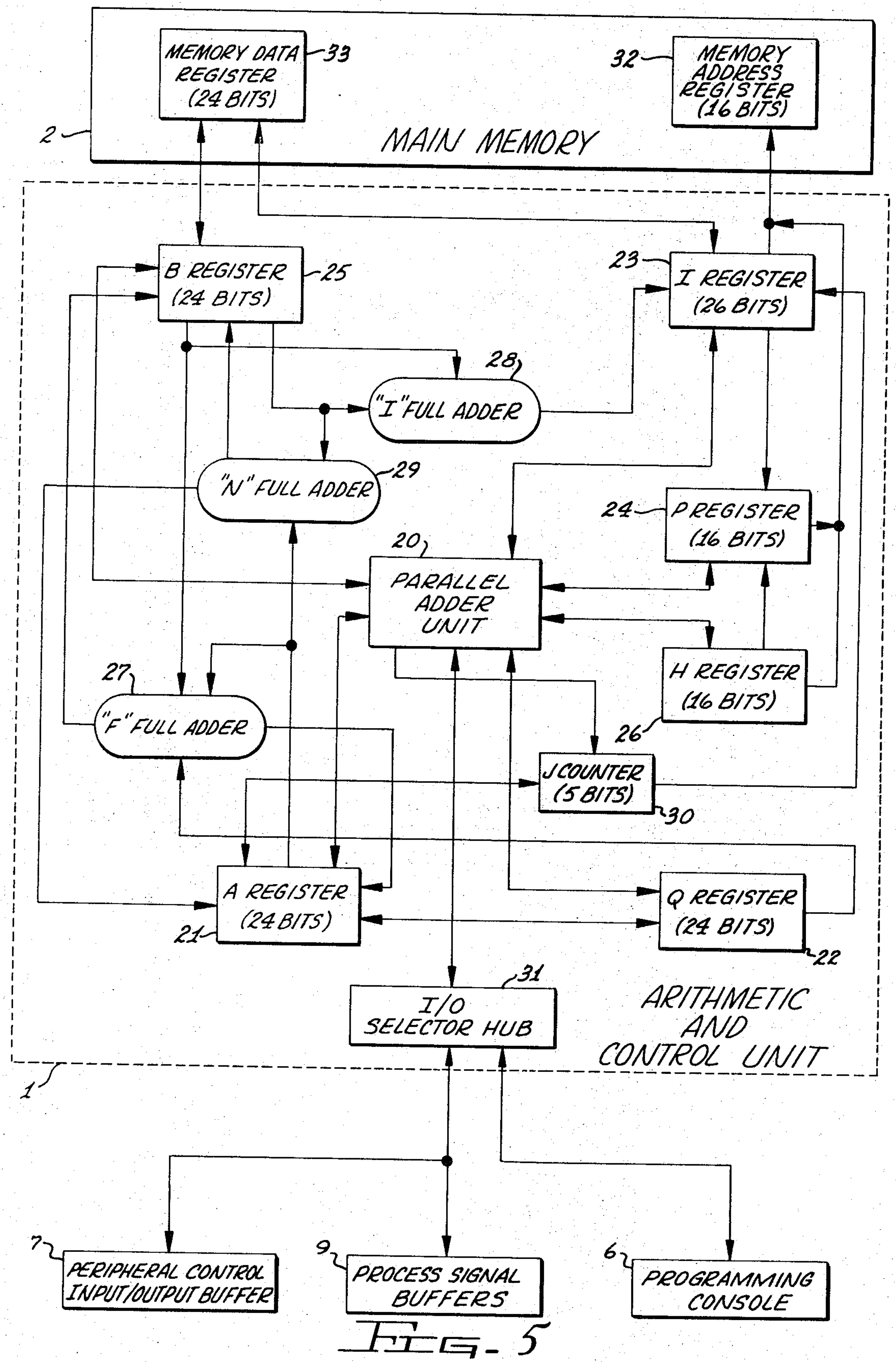
FIG. 5 is a block diagram of the arithmetic and control unit utilized in the information processing system of FIG. 1.

FIG. 5 is a simplified block diagram of the Arithmetic and Control Unit (henceforth, Arithmetic Unit) 1 and the registers within the Main Memory module 2 with which it is in direct communication. The block diagram indicates the functional relationship between the several registers, a Parallel Adder Unit, and three serial full adders. Transfer of information between registers and other elements of the Arithmetic Unit 1, as indicated by the interconnecting lines of FIG. 5, is effected by parallel and/or serial transfer of binary digits from the source register or element to the receiving register or element. In the introductory description that follows, only the basic register characteristics and functions and the more usual information flow paths are discussed as a basis for more detailed and expanded discussion of the invention as the specification progresses.

The Parallel Adder Unit (henceforth PAU) 20 is a 24-bit parallel adder with simultaneous (look-ahead) carry propagation between each group of 4 bits which may be enabled or disabled as required. For a general discussion of parallel adder units with simultaneous carry propagation capability, one may refer to pages 390 and 391 of Digital Computer Design Fundamentals by Yaohan Chu and previously referred to in this specification. All parallel arithmetic operations within the Arithmetic Unit 1 are accomplished within the PAU 20. In addition to its arithmetic function, the PAU 20 serves as a "hub" for most parallel transfers of data between the other Arithmetic Unit 1 registers.

The A Register 21 is a 24-bit accumulator for arithmetic operations and bit manipulations. It is capable of either right or left serial shifting in addition to normal, parallel, information exchange with the PAU 20. Parallel transfer of information may be effected between a portion of the A Register 21 and the J Counter 30 for floating point operations. The A Register 21 is also capable of communicating with the Q Register 22, the "F" Full Adder 27, and the "N" Full Adder 29.

The Q Register 22 is a 24-bit auxiliary accumulator used in conjunction with the A Register 21 for double precision arithmetic operations. In addition, the contents of the Q Register 22 are used to define operative fields of the A Register 21 and/or B Register 25 during the performance of Field commands, another sub-category of Operand commands, in which only the specified fields (groups of one or more bits) of an information word are affected. The Q Register is also capable of left or right shifting and of normal parallel transfer of information to or from the PAU 20 and is capable of communicating with the "F" Full Adder 27.

The I (Instruction) Register 23 is a 26-bit register which holds the command word being executed at a given time. Two bits, A and B, are interposed between bits 14 and 13 of a standard 24-bit command word when in the I Register 23 to provide a 16 bit operand field for extended memory addressing. Information transferred to or from the I Register 23 normally moves in parallel although portions of the I Register 23 may be serially shifted under certain conditions. The I Register 23 is capable of communicating with the PAU 20, the P Register 24, the "I" Full Adder 28, the Memory Address Register 32, and the Memory Data Register 33.

The P (Program Location) Register 24 is a 16-bit register which normally specifies the address of the storage location in the Main Memory module 2 from which the next command to be executed is to be extracted. All information is transferred to and from the P Register 24 in parallel. The P Register 24 is capable of communicating with the Parallel Adder Unit 20, the I Register 23, the H Register 26, and the Memory Address Register 32.

The B Register 25 is a 24-bit parallel-entry buffer register disposed between the Main Memory module 2 and the processing registers of the Arithmetic Unit 1. All information passing to or from the storage locations in the Main Memory module 2 is routed through this register via the Memory Data Register 33. The B Register 25 is capable of being right shifted during the performance of certain commands with which the B Register 25 is utilized as a functional information processor as well as a buffer. Information is transferred between the B Register 25 and the PAU 20 in parallel. The B Register 25 is also capable of communicating with the "F" Full Adder 27, the "I" Full Adder 28, and the "N" Full Adder.

The H (Holding) Register 26 is a 16-bit register used primarily to provide temporary information storage during the execution of certain "extended function" commands. This register is capable of accepting parallel data from the PAU 20 and transferring parallel data to the PAU 20, the P Register 24, and the Memory Address Register 32.

The "F" Full Adder 27 is used to implement arithmetic and logical manipulation on fields specified by the Q Register 22 during the performance Field commands and also to update a portion of List Control Words during the execution of List commands which affect certain storage locations in specified portions of the Main Memory 2.

The "I" Full Adder 28 is used to compute, from information contained within List Control Words, the relative location of items to be removed or appended to lists stored in the Main Memory module 2 during the performance of List commands.

The "N" Full Adder 29 is used to implement arithmetic and logic manipulations of the A Register 21 and to update second and third portions of List Control Words during the performance of List commands.

The J Counter 30 is a 5-bit counter used to control information manipulation and certain aspects of timing during the execution of a number of commands which require counting in one form or another, some according to variable conditions.

The Input/Output (henceforth, I/O) Selector Hub 31 provides Arithmetic Unit communications with the Peripheral Control Input/Output Buffer 7, the Process Signal Input/Output Buffer 9, and the Programming Console 6. The I/O Selector Hub enables one of a plurality of selectable 24-bit I/O information channels during the execution of certain commands. All parallel data transfers from Input/Output devices are routed through the I/O Selector Hub 31 to the PAU 20 for further distribution within the Arithmetic Unit 1.

The Memory Address Register 32 is a 16-bit register which is an integral part of the Main Memory module 2 rather than the Arithmetic Unit 1. However, it receives a 16-bit truncated word directly from the P, I, or H Registers of the Arithmetic Unit 1, which word specifies the Memory storage address for the next stored 24-bit word which is to be transferred from Main Memory 2 into the Arithmetic Unit 1 via the Memory Data Register 33.

The Memory Data Register 33 is also an integral part of the Main Memory module 2. It is a 24-bit register which holds any word just extracted from a Memory storage location in response to a specific address having been placed in the Memory Address Register 32 and a Memory request having been made by the Arithmetic Unit 1. The Memory Data Register 33 communicates with the B Register 25 and I Register 23 of the Arithmetic Unit.

Logic and logic combinations

In a fundamentally binary information processing system, any given signal representing a single bit of information must always be either true or false, or, as it is more commonly expressed, either "one" or "zero." Ordinarily, these states are represented within an information processor, other than as stored in Memory devices, by two discrete voltage levels. For example, a voltage level of nominally five volts positive may correspond to a binary "one" signal, and a voltage level of nominally zero volts to a binary "zero." The choice of voltage levels is arbitrary except for the consideration of using specific types of logic circuitry which may be preferred or prescribed. It is not uncommon for the two discrete voltage levels which represent "one" and "zero" conditions to be different in different logic areas of an information processing system; that is to say, a system in which "ones" and "zeros" are normally represented by five volts positive and zero volts levels respectively may include areas in which conditions require a wider voltage disparity and, perhaps, a polarity inversion. These areas might have logic voltage levels, for example, of 18 volts negative for "ones" and six volts positive for "zeros." For these reasons, it is standard practice to explain binary logic systems in straightforward terms of "one" and "zero" conditions without excessive concern for the precise arbitrary voltages representing these conditions.

Temporary storage of a bit of information may be effected by deliberately setting a bistable device to one or the other of its stable states to represent a "one" or a "zero." The bistable device most widely used in electronic information processors is the well known "flip-flop." A flip-flop is said to be in either the "one" state or the "zero" state and has the capability of retaining a state into which it has been placed until it is operated upon and forced into its alternate state. A change of state of a flip-flop is normally brought about by applying a voltage pulse to a "set" or "clear" (sometimes called "reset")

input. As a practical matter, a flip-flop is usually designed to respond to voltage transients so that a change of state occurs, according to design, on the trailing or leading edge of a voltage pulse applied to a flip-flop input.

The state of a flip-flop may be reflected in one or more outputs, and a flip-flop is usually provided with both "one" and "zero" outputs. Should a flip-flop be in the "one" or set state, the "one" output would be true and the "zero" output would be false. If positive five volts and zero volts represent "one" and "zero" signal levels within the local logic area of the system, the "one" output would be positive five volts and the "zero" output would be zero volts. On the other hand, if the flip-flop is in the "zero" or cleared state rather than set, the "one" output would be zero volts or false and the "zero" output would be positive five volts or true.

Figure 6A:
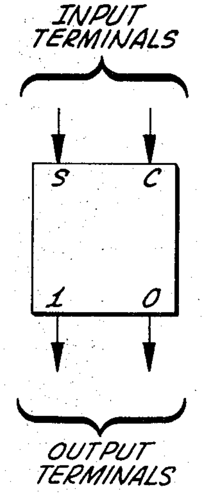
FIG. 6*a* is a logic symbol for a flip-flop.
Figure 6B:
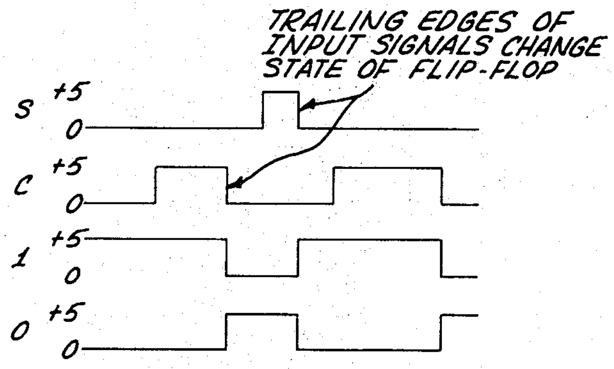
FIG. 6*b* is a diagram showing the relationship between the input and output signals of the flip-flop of FIG. 6*a*.

FIG. 6*a* shows a logic symbol for a flip-flop with its input and output terminals indicated. FIG. 6*b* is a voltage/time diagram which illustrates the response characteristics of a flip-flop to set and clear pulses applied to the appropriate input terminals.

Information requiring a plurality of bits for definition may be temporarily stored in a group of flip-flops which make up a register. Hence, a 24-bit word may be placed in a 24-bit register, and the state of each flip-flop in the register may be ascertained by observing the voltage levels at the individual "one" and "zero" outputs. The flip-flops of a register may be interconnected to permit serial shifting of the information bits in unison to the next higher order or next lower order bit position relative to each. A brief explanation of serial shifting may be found on pages 95 and 96 of Digital Computer Primer by E. M. McCormick and previously referred to in this specification. Entry of information into a register may be performed serially or in parallel to each individual flip-flop in unison. The flip-flops of a register may also be interconnected such that the register functions as a counter to accumulate intermittent pulses from one or more pulses.

Figure 7A:
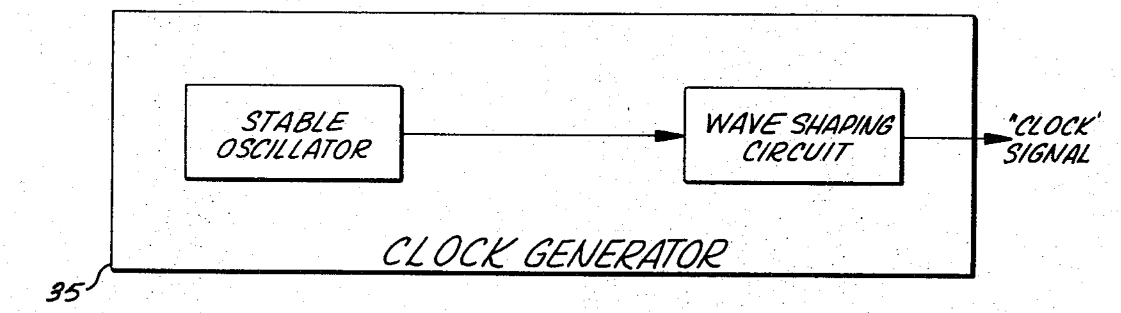
FIG. 7*a* is a block diagram of a clock signal generator utilized in the information processing system of FIG. 1.
Figure 7B:
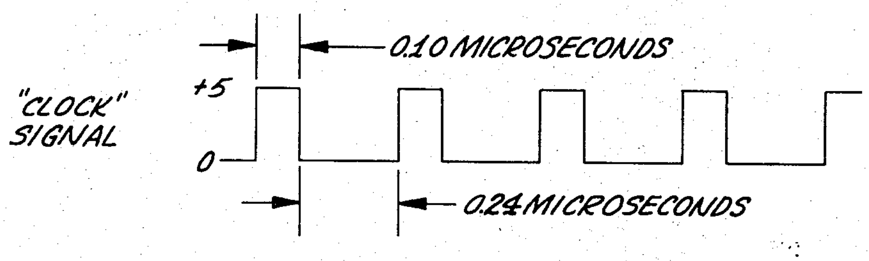
FIG. 7*b* is a voltage/time diagram of the output of the clock signal generator of FIG. 7*a*.

Movement of information between the registers of an information processor and many other related (functions are performed in relative synchronism. A common time base generator is therefore required; and this conveniently may be a stable oscillator and a suitable wave shaping circuit to produce a train of regular, rectangular pulses often designated the "Clock." The "one" and "zero" positions of a Clock pulse train may be time symmetrical or asymmetrical as may be appropriate for the system which it governs. FIG. 7*a* is a block representation of a Clock Generator 35, and FIG. 7*b* is a diagram showing the time and voltage dimensions of a 2.94 megacycle Clock signal suitable for use in an information processing system with which the present invention may be practiced.

Generally, two or more output signals from flip-flops and/or other bistable devices such as switches are combined logically, sometimes with and sometimes without a Clock or other timing signals, by "gates" to provide input signals to other flip-flops and to provide gating signals which are logically combined with binary information signals to control information movement within the system, both as to path and as to relative time.

A gate has a single output which reflects logically the instantaneous state of its inputs. These inputs may, for logical design purposes, be any number required. Gates with certain distinctive characteristics are conventionally designated AND gates, OR gates, NAND gates, NOR gates, and NOT gates. Gates are represented in logic diagrams by standard symbols according to their characteristics, which characteristics may be summarized in a truth table for each type of gate. For example, a logic notation symbol for a two-input AND gate and its truth table are shown in FIGS. 8*a* and 8*b*, respectively. It will be observed that only when inputs A and B are both "ones" will the output W be a "one." If one or more of the inputs should change to "zero," the output would switch to "zero."

FIG. 9*a* shows a logic notation symbol for a two-input OR gate and FIG. 9*b* its truth table. It will be observed that if one or the other or both the inputs F and G is "one" then the gate output will be "one." If the inputs are all "zeros," the output X will be "zero."

Equivalent logic notation symbols and their corresponding truth tables for NAND and NOR gates are shown in FIGS. 10*a*, 10*b* and 11*a*, 11*b* respectively.

Another element widely used in binary logic networks is the logical inverter which has a single input and a single output and, as its name implies, converts a "one" input to a "zero" output and a "zero" input to a "one" output. A logic notation symbol and truth table for the logical inverter are shown in FIGS. 12*a* and 12*b*. The logical inverter is also known as the NOT gate.

A three-input, four-output logic element known in the art as a "full adder" is represented by the logic notation symbol shown in FIG. 13*a*. The characteristics of a full adder are summarized in a table presented in FIG. 13*b*. The S and $\overline{S}$ outputs are complementary "sum" signals, and the C and $\overline{C}$ outputs are complementary "carry" signals. Full adders are used, often in conjunction with "carry" flip-flops, to perform binary arithmetic. It may be observed that the full adder characterized in FIG. 13*b* "adds" in response to "zero" inputs rather than "one" inputs. This is merely a matter of circuit preference, and full adders responding to "one" inputs are also well known in the art.

In order to achieve meaningful and orderly movements of information between the various registers and other elements of an information processor, after a need for specific movements and combinations of movements has been established, gating signals must be generated or issued which permit the prescribed movements of information at the desired time and inhibit any undesirable movements of information at the same time. The exact manner in which a specific signal may be generated according to precisely defined conditions within a computer system at certain precisely defined times has become a matter of common knowledge within the art. Generally speaking, a signal issues, usually as a gate output, when all requisite conditions are satisfied in its logic chain. The conditions in a chain are themselves represented by other signals which may be individually dependent upon a higher order logic chain relative to the specific signal of interest. Alternatively, it is manifest that these higher order logic chains can simply be considered elements of the total set of conditions upon which the issuance of the ultimate signal depends. The origin of a given signal can thus be traced back to a unique set of conditions each of which depends upon the state of a bistable device at a given instant of time and which may or may not be logically combined with timing signals such as a Clock.

A unique mnemonic designation is conventionally assigned to each unique signal within a binary information processing system. In the present system, signals are identified by four characters mnemonic designations. The Clock, for example, is designated TCKA. Following standard logic notation practice, a signal designated $\overline{TCKA}$ is the logical inversion of TCKA as indicated by the bar over the mnemonic. Whenever TCKA is "one," $\overline{TCKA}$ must be "zero;" and whenever TCKA is "zero," $\overline{TCKA}$ must be "one."

The set of conditions which must be fulfilled for a given signal to be "one" may be expressed by the classical logic or Boolean equation. The use of Boolean Algebra to represent binary logic combinations has become so universally known and practiced in the art that it need not be discussed at length here. An elementary treatment, adequate for an understanding of this specification, may be found in Appendix A of Digital Computer Primer by E. M. McCormick, previously referred to in this specification. For a more extended discussion of Boolean Algebra and its use in logical design, one may see chapters 3 and 4 of Digital Computer Design Fundamentals by Yaohan Chu and previously referred to in this specification.

It is of some importance to understand that what is commonly and conventionally designated a "signal" in a binary information processor is often conceptually both a signal and an electrical point where the signal is represented as a function of time by one of two discrete voltage levels. For this reason, a logic equation wherein a given signal is expressed in terms of other signals also defines the orientation and interconnection of logic elements, such as gates and inverters, by which the signal is generated. As an example, assume that a combination of logic elements is to produce a "one" output signal when either one, but not both, of two input signals A and B is "one." Further, assume a restriction to the use of AND gates, OR gates, and NOT gates to achieve the desired result.

A logic element combination that meets these requirements and restrictions is presented in FIG. 14. If a "one" signal is present at either A or B, but not both, a "one" output will be realized at X, the output from AND gate 42. The AND gate 40 is not enabled since one or the other of its two enabling requirements has not been met, and, as a consequence, its output C is "zero." The NOT gate 41 converts this "zero" signal to a "one" signal at point D to enable one input of the AND gate 42. The OR gate 43 is enabled since it will respond to a "one" signal at either A or B to produce a "one" signal at E which enables the remaining input of the AND gate 42. If "one" signals are present at both A and B, a "zero" signal will appear at point X. The AND gate 40 will produce a "one" output at C since both its input signals are "one"; the NOT gate 41 will therefore produce a "zero" output at point D to disable one input of the AND gate 42. If "zero" signals are present at both A and B, a "zero" output will appear at point X. The OR gate 43 will be disabled since neither of its inputs is "one." The OR gate 43 will therefore produce a "zero" output at point E to disable one input of the AND gate 42.

The logic combination shown in FIG. 14 is sometimes referred to as an EXCLUSIVE OR gate because of its one-or-the-other-but-not-both characteristic. The logical relationship of the signals employed in FIG. 14 are defined by the equation $C=A\bar{B}+\bar{A}B$ which is read, according to conventional Boolean notation discussed in the above-cited references, as: C must be "one" when A but not B is "one" or when B but not A is "one."

If NAND gates are used, the logic element combination of FIG. 15 will function in the same logical manner as that shown in FIG. 14. The NAND gate 44 of the FIG. 15 combination performs the functions of both the AND gate 40 and the NOT gate 41 of the FIG. 14 combination.

The logic circuits providing the trigger input signals to a flip-flop may be illustrated by a set of logical schematic diagrams for each flip-flop. These logical schematic diagrams are termed herein "flip-flop input" diagrams. Flip-flop input diagrams are employed in FIGS. *23a–23c, 25a–25c, 27a–27c* and 28 to illustrate the logical circuits providing input signals to the flip-flops of B Register 25, A Register 21, Q Register 22, and J Counter 30, employed in the binary floating point apparatus of the invention.

In addition to flip-flop input diagrams, another type of logical schematic diagrams, termed "logical combination signal" diagrams is employed. Certain signals generated within logical chains are identified by signal designations. Such signals are the output signals of a first logical chain and are employed as input signals to one or more additional logical chains. The logical combination signal diagram is a representation of such a first type logical chain. Logical combination signal diagrams are employed in FIG. 33 to illustrate the logical structures generating certain signals employed in the invention.

The means by which a skilled logical designer, who is aware of which logical elements are available and of their characteristics, can determine the exact logic elements and exact interconnection required for a logic chain ending in a signal which has been defined by a logic equation is explained at length in many standard texts. One may refer to chapter 3 and, particularly chapter 4, of Digital Computer Design Fundamentals by Yaohan Chu and previously referred to in this specification. The use of logical schematic diagrams to provide simple, compact and readily analyzed representations of component structures and to identify signal relationships, circuit elements and circuit relationships is also described in detail in U.S. Pat. 3,077,984 issued to Robert R. Johnson and assigned to the assignee of the present invention. It is thus readily apparent from the above that the creation of a unique control signal defined in terms of other control and timing signals is well known in the art and no further explanation will be given here.

Timing and normal sequence control states 1 and 2

Figure 16:
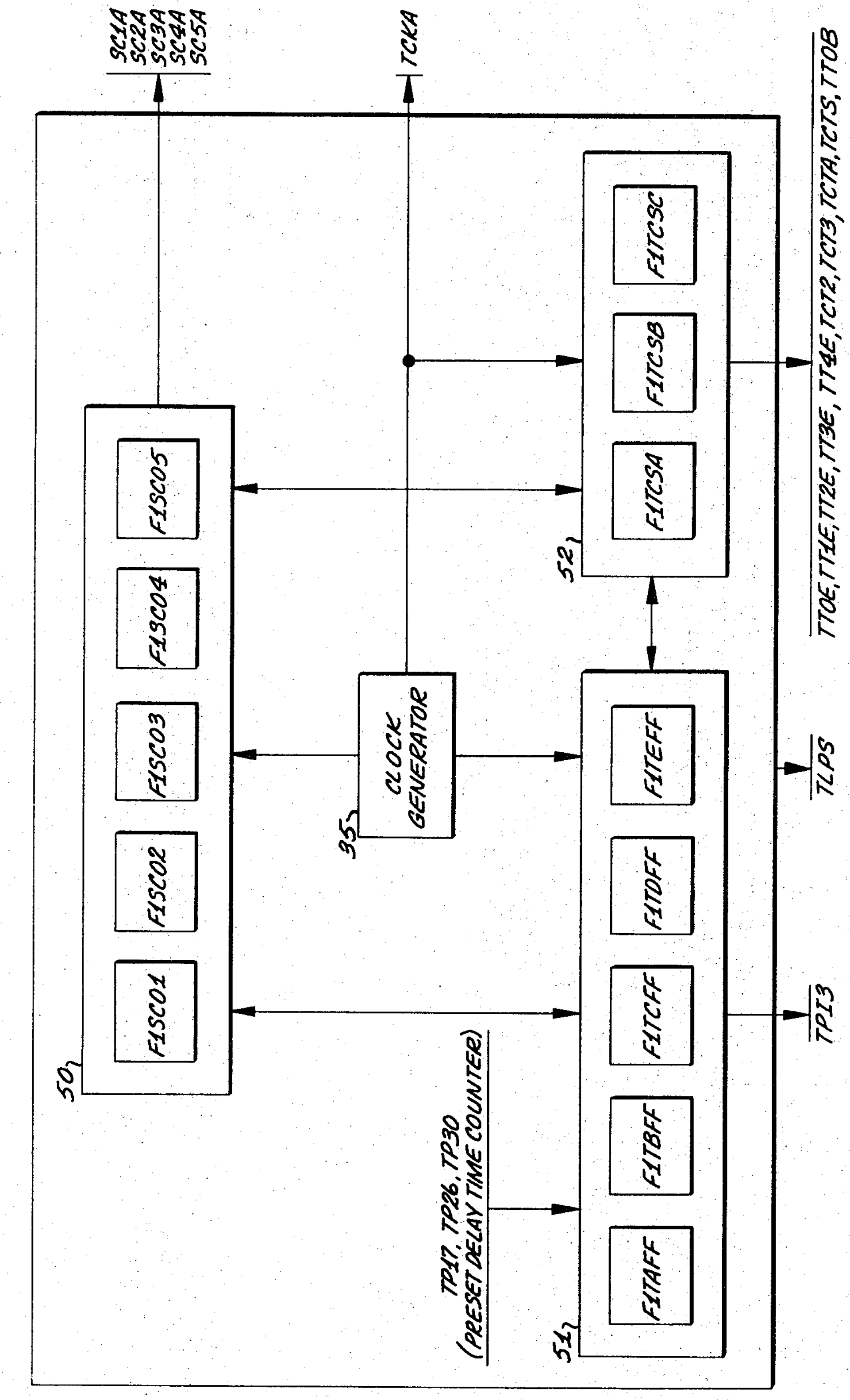
FIG. 16 is a block diagram of the timing logic area of the arithmetic and control unit of FIG. 5.

To maintain an orderly and efficient succession of operations within the Arithmetic Unit 1, Sequence Control logic 50 provides five mutually exclusive Sequence Control States which are defined by five Sequence Control Flip-Flops designated F1SC01, F1SC02, F1SC03, F1SC04, and F1SC05 as shown in the Timing Block Diagram of FIG. 16.

The Sequence Control State 1 Flip-Flop F1SC01 defines the "fetch" cycle for all commands. The fetch cycle is that period during which a command stored in Main Memory 2 is requested, is transferred from Main Memory 2 to the Arithmetic Unit 1, and is routed into the I Register 23. In addition, the count in the P Register 24 is usually incremented during Sequence Control State 1, and other information movement among the registers may occur. A few commands which can be completed by a simple group of operations are completely executed during Sequence Control State 1. Relative Addressing, when specified by bit 14 of the command word, also occurs during Sequence Control State 1. Timing signal SC1A is "one" when the Sequence Control State 1 Flip-Flop F1SC01 is set.

The Sequence Control State 2 Flip-Flop F1SC02 defines the sequencing cycle when index modification occurs. In addition, Sequence Control State 2 is entered during the performance of several commands that utilize the X bits (17–15) of a command word for purposes other than normal index modification. Sequence Control State 2, when required, is normally entered immediately following Sequence Control State 1. Timing Signal SC2A is "one" when the Sequence Control State 2 Flip-Flop F1SC02 is set.

The Sequence Control State 3 Flip-Flop F1SC03 is used to provide additional bit manipulation time for a number of commands under certain conditions prior to further execution. The time extent of Sequence Control State 3 is determined by the requirements of the individual commands. Timing signal SC3A is "one" when the Sequence Control State 3 Flip-Fop F1SC03 is set.

The Sequence Control State 4 Flip-Flop F1SC04 defines the final execution state for most commands. Sequence Control State 4 is entered following Sequence Control States 1, 2, or 3 depending on the nature of the command being executed. Like Sequence Control State 3, Sequence Control State 4 may be time-extended as required for individual commands. Timing signal SC4A is "one" when the Sequence Control State 4 Flip-Flop F1SC04 is set.

The Sequence Control State 5 Flip-Flop F1SC05 defines a time period necessary for performing additional functions required to complete the execution of a few commands. Timing signal SC5A is "one" when the Sequence Control State 5 Flip-Flop F1SC05 is set.

Figure 20:
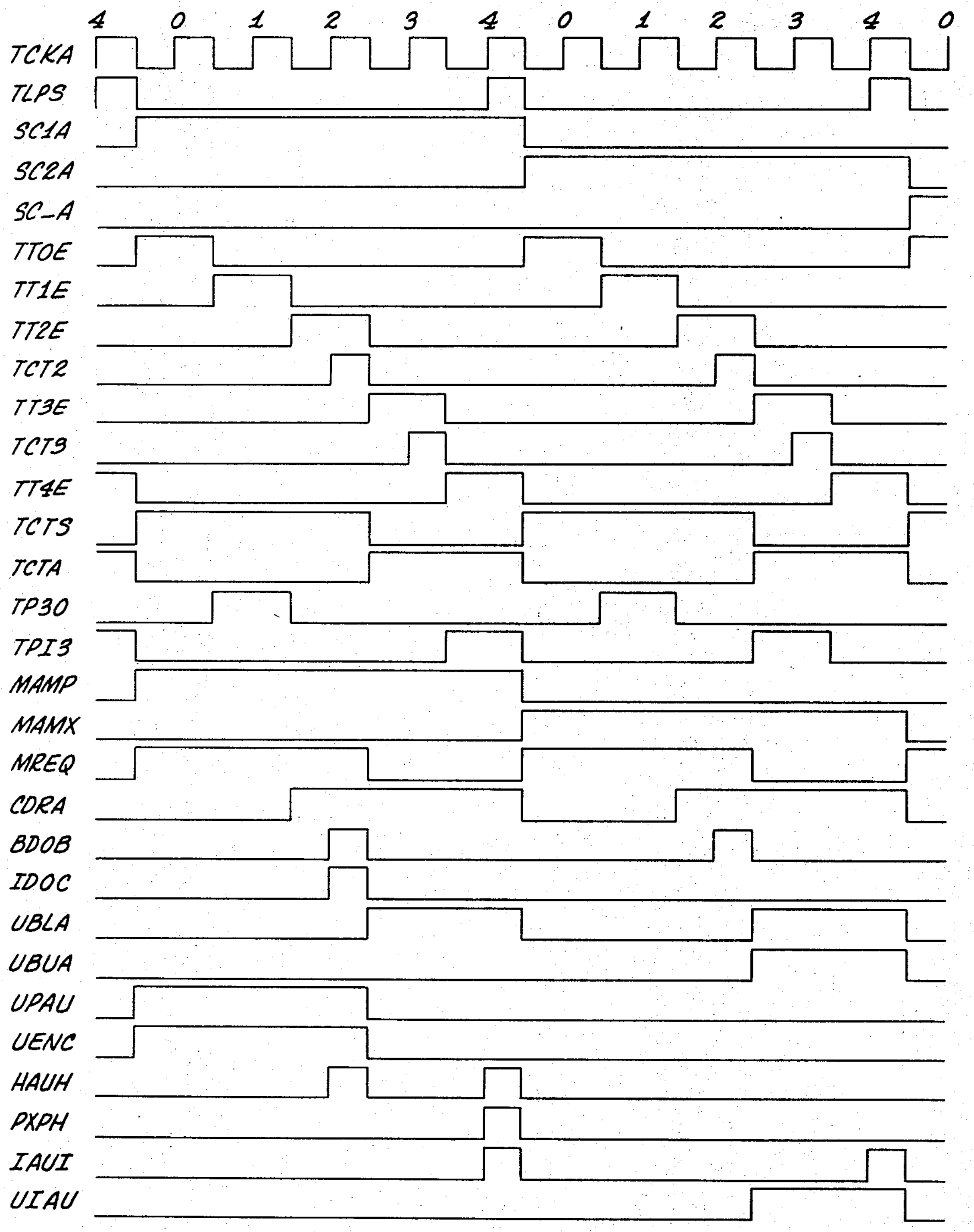
FIG. 20 is a timing diagram illustrating the timing sequence of signals which effect the information movement indicated in FIGS. 18 and 19 and also illustrating the interrelationship of the timing signals generated in the timing logic area of FIG. 16.

The timing control signals required for optimum operation within each Sequence Control State and for insuring timely changes from one Sequence Control State to another are generated by a Delay Time Counter 51 and a Sequence Time Counter 52 in conjunction with the Clock signal TCKA provided by the Clock Generator 35. In FIG. 20 and subsequent timing diagrams, the Clock signal TCKA is drawn symmetrically for convenience rather than asymmetrically as in FIG. 7*b*. The Sequence Time Counter 52 comprises three Flip-Flops: F1TCSA, F1TCSB, and F1TCSC. The timing signals decoded from the Sequence Time Counter 51 are tabulated in FIG. 17 along with the logic equations for the counter advancing pulses which are developed in the logic immediately associated with the Sequence Time Counter 52.

The Delay Time Counter 51 comprises five Flip-Flops: F1TAFF, F1TBFF, F1TCFF, F1TDFF, and F1TEFF. It is used to provide special control signals during the execution of commands requiring extension of the normal durations of Sequence Control States 3 and/or 4. The Delay Time Counter 51 is preset during Sequence Control States 3 and/or 4 of these commands to a count less than $30_8$ and is then incremented by the Clock signal TCKA. During all other Sequence Control States, the Delay Time Counter 51 is preset to $30_8$ and is inhibited from being incremented. A Delay Time Counter Complete signal TP13 becomes "one" when the Delay Time Counter 51 count reaches $30_8$ and the Sequence Time Counter 52 is in the TT4E state. When this condition is attained, a Last Pulse signal TLPS is generated coincident with TCKA. The trailing edge of signal TLPS during any Sequence Control State clears the Sequence Time Counter 52, and the timing cycle for the next Sequence Control State is entered. At the trailing edge of signal TLPS of the final Sequence Control State for the execution of any command, Sequence Control State 1 is re-entered to initiate execution of the succeeding command.

The primary function of Sequence Control State 1 is to bring a command stored in Memory at an address specified by the contents of P Register 24 into the Arithmetic Unit 1 so that it may be decoded and executed. In addition, the P Register 24 is normally incremented during Sequence Control State 1 so that it will contain the address of the next command to be executed if the normal program sequence is followed. It may be noted here that certain conditions or commands can dictate a deviation from the straight instruction sequence provided by the P Register 24.

The primary purpose of Sequence Control State 2 is to implement conventional index modification when bits 15, 16, and 17 of a command word being executed are not all "zeros." This condition will have been detected during TCTA time of Sequence Control State 1 and appropriate signals generated so that Sequence Control State 2 is entered at the end of Sequence Control State 1.

Figure 18:
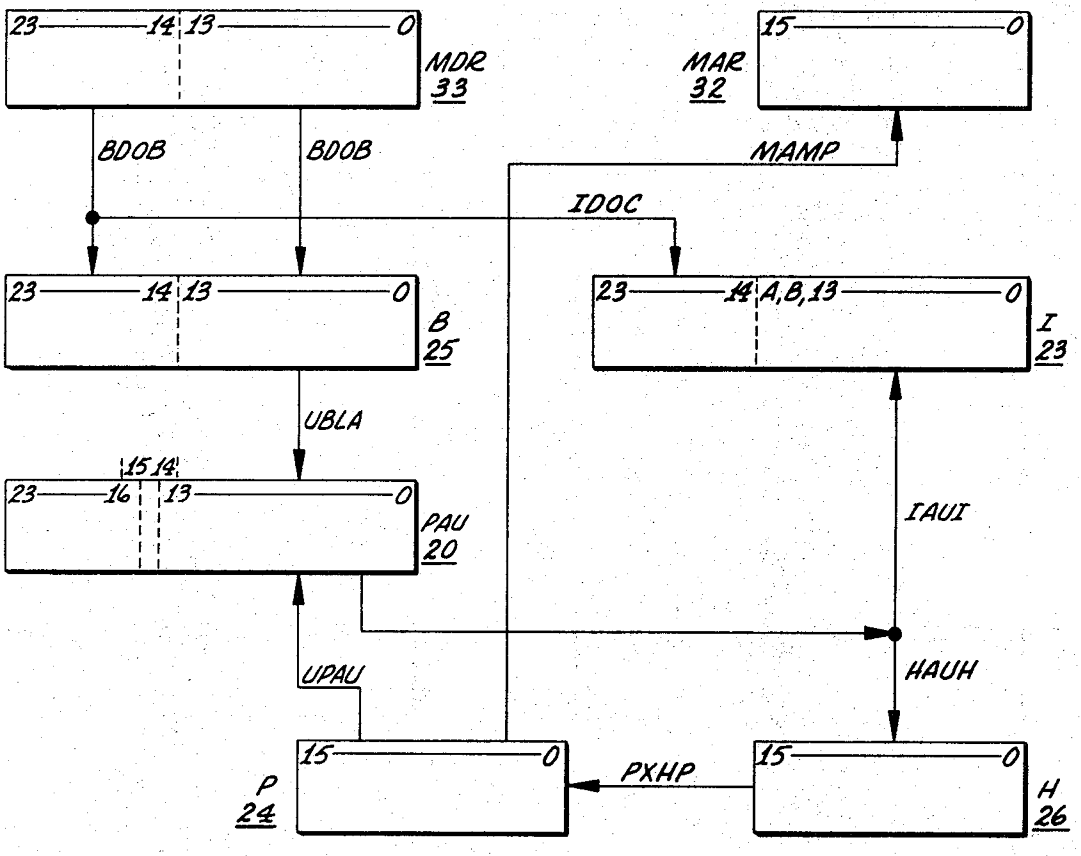
FIG. 18 is a block diagram indicating the major information flow paths opened between various registers of the arithmetic and control unit of FIG. 5 in a normal first sequence control state during the execution of a typical command.
Figure 19:
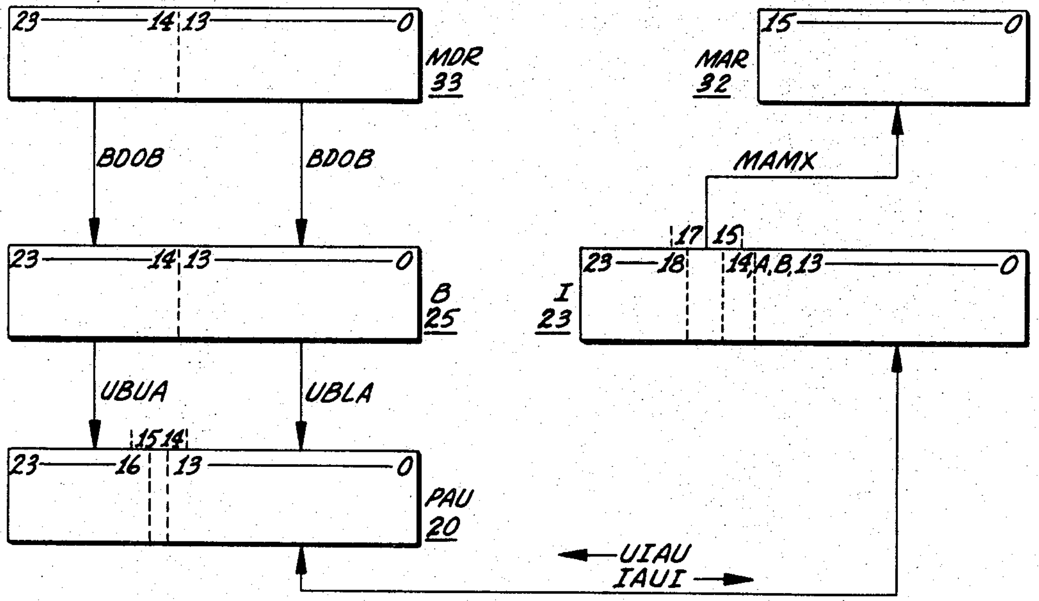
FIG. 19 is a block diagram indicating the major information flow paths opened between various registers of the arithmetic and control unit of FIG. 5 in a normal second sequence control state during the execution of a typical command.

The signals generated and the information flow scheme which takes place during Sequence Control States 1 and 2 is identical or nearly so for all commands. FIGS. 18 and 19 are block diagrams which indicate the information flow paths established during normal Sequence Control States 1 and 2, respectively; and FIG. 20 is a timing diagram of the important gating signals which permit the proper paths to be established. In addition, the normal timing signals utilized within every Sequence Control State are included in the timing diagram of FIG. 20.

Figure 22:
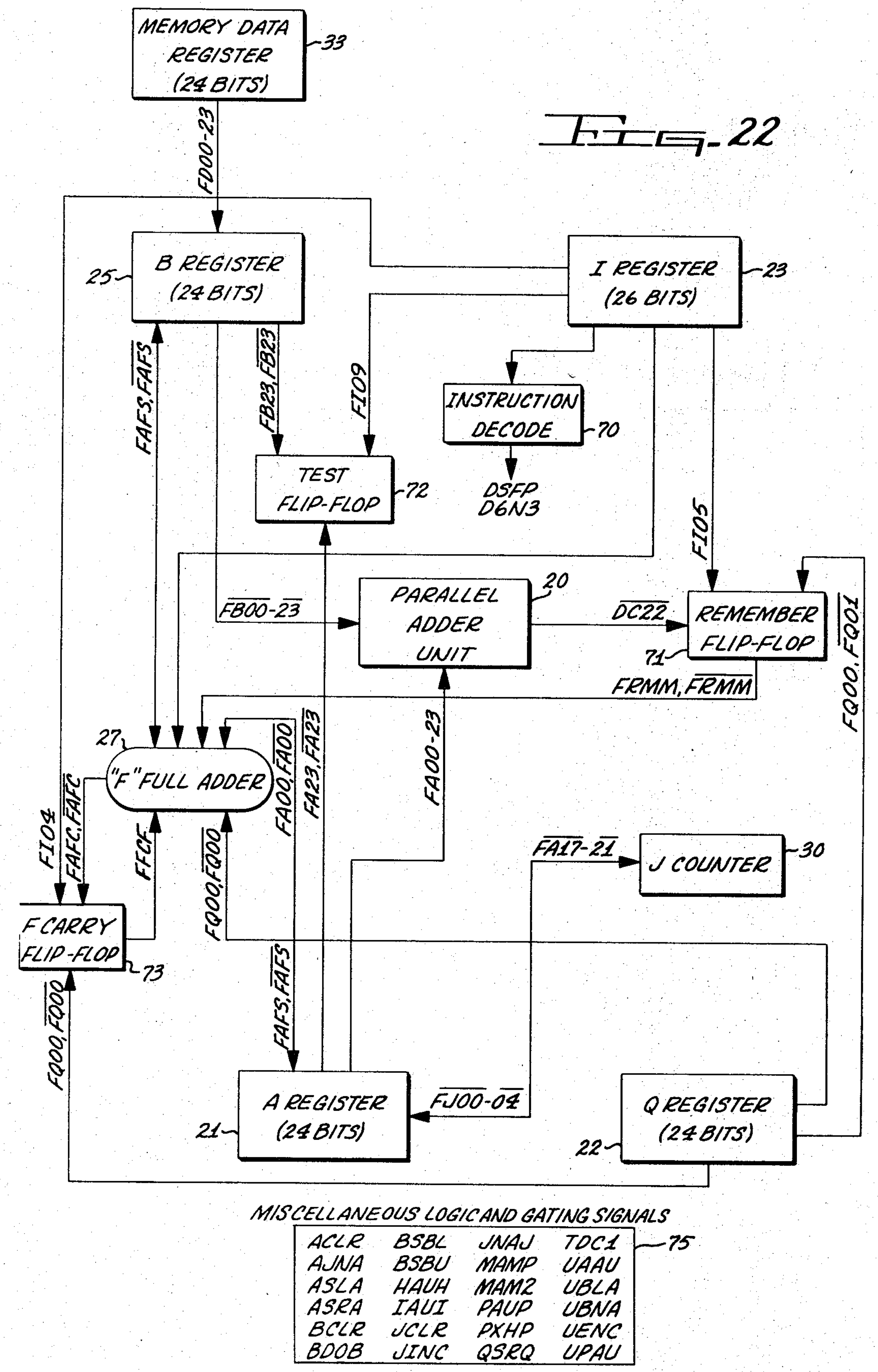
FIG. 22 is a block diagram illustrating the major components of the system which are employed to process floating-point numbers.

The operation and function of normal Sequence Control States 1 and 2 may best be understood by considering the following description in conjunction with FIGS. 1, 5, 18, 19, 20, and 22. FIG. 22 is a block diagram showing the logic areas of the Arithmetic Unit 1 from which the more important signals issue.

It should be noted that the Main Memory module 2 operates asynchronously with the Arithmetic Unit 1. To fetch a stored command word, Sequence Control State 1 is entered, and the Main Memory module 2 is alerted that a request is being made by the MREQ signal as shown in the timing diagram FIG. 20. Simultaneously, the contents of the P Register 24 are gated to the Memory Address Register (MAR) 32 by the MAMP signal. The contents of the specified storage location in the Main Memory module 2 are fetched and placed into the Memory Data Register (MDR) 33 by the Main Memory module 2 logic functioning independently from the Arithmetic Unit 1. When the requested word is available from the Memory Data Register 33, the Main Memory module 2 generates a Data Ready signal CDRA to the Arithmetic Unit 1; and during TCT2 time, the contents of the Memory Data Register 33 are gated to the B Register 25 by the BDOB signal. Additionally, Memory Data Register 33 bits 23–14 are gated to the I Register 23 bit positions 23–14 by the IDOC signal so that operation code decoding may commence. During TCTA time, B Register bits 13–0 are gated to bit positions 13–0 of the PAU 20 by the UBLA signal. At the trailing edge of signal TLPS during Sequence Control State 1, bits 15–0 of the PAU 20 are gated to bit positions A, B, 13–0 of the I Register 23 by the IAUI signal and to the H Register 26 by the HAUH signal.

Normal incrementation of the P Register 24 also occurs during Sequence Control State 1 and is brought about in the following manner without disturbing the information flow between the various Arithmetic Unit 1 elements. During TCTS time, the contents of the P Register 24 and a count of one are simultaneously gated to the PAU 20 by the UPAU and UENC signals, respectively. The output signals from the PAU 20 at this time represents the desired sum, P+1. This sum is gated to the H Register 26 by the HAUH signal which occurs during TCT2 time. At the trailing edge of signal TLPS, the contents of the H Register 26 are gated to the P Register 24 by the signal PXHP as the output signals from the PAU 20 bit positions 15–0 are gated to the H Register by the HAUH signal.

Thus, at the end of a normal Sequence Control State 1, the I Register 23 contains the command which has been requested from Main Memory module 2, the P Register 24 count has been incremented by one, the operand address portion of the fetched command word is in the H Register 26 and the next required Sequence Control State may be entered to continue the execution of the command. It will be observed that the operation code portion of the command word is in the I Register 23 during TCTA time of Sequence Control State 1, and appropriate control signals generated from instruction decoding become available at that time to influence: (a) the remainder of Sequence Control State 1 (as required for a very few commands), (b) the Sequence Control State which will be entered next following signal TLPS, and (c) the action to be taken during the succeeding Sequence Control States.

Assuming that bits 17–15 of the command word of the instruction being executed are not all "zeros," Sequence Control State 2 will be entered following Sequence Control State 1. The signal MREQ again becomes "one" to indicate a request to the main Memory module 2. Simultaneously, the contents of the I Register 23 bit positions 17–15 are gated to the Memory Address Register 32 bit positions 2–0 by the MAMX signal to specify the memory storage location indexing quantity is to be fetched. This is conveniently one of the low order memory storage locations 00001 to $00007_8$; therefore, the higher order bit positions of the Memory Address Register 32 are simply cleared by the MAMX signal. When the CDRA signal indicates that the requested modifying data is available from the Memory Data Register 33, its contents are gated to the B Register 25 by the BDOB signal during TCT2 time. During TCTA time, the contents of the B Register 25 are gated to the PAU 20 by the UBLA and UBUA signals. Simultaneously, the contents of the I Register 23 bit positions A, B, 13–0 are also gated to the PAU 20 by the UIAU signal. The output signals from the PAU 20 then represent the sum of the operand address portion of the command word present in the I Register 23 and the modifying word or index quantity stored in the specified index core cell. At the trailing edge of signal TLPS, the sum is gated from the PAU 20 bit positions 15–0 to the I Register 23 bit positions A, B, 13–0 by the IAUI signal, and the sequence control timing enters the next appropriate Sequence Control State according to the requirements of the individual command temporarily stored in the I Register 23. A few commands which affect or test the index cells use the index bits for instruction control and do not change the operand address portion of the command word.

In the following detailed description of the present invention, the assumption is made that the exemplary commands are not indexed in order that the timing charts do not become unnecessarily complex. It is to be understood, of course, that these command can be index-modified in the manner just described.

Floating-point apparatus-details

Figure 21A:
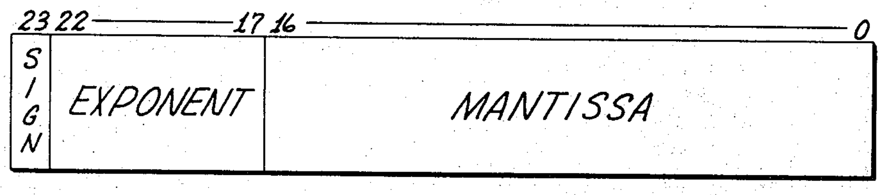
FIGS. 21*a*–21*d* are symbolic diagrams illustrating the organization of floating-point numbers employed in the system of FIG. 1.

The organization of floating-point numbers in the system is illustrated in FIG. 21*a*. The contents of bit positions 0–16 of the floating-point number comprise the mantissa while the contents of bit positions 17–22 comprise the exponent. Bit position 23 contains the sign of the floating-point number.

Figure 21B:
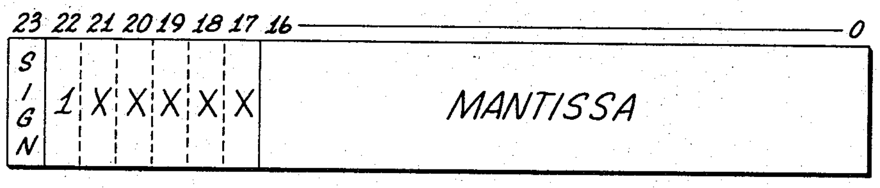
Figure 21C:
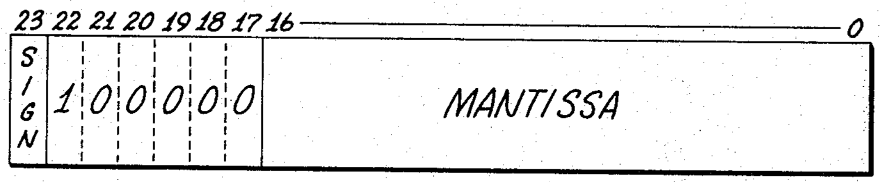
Figure 21D:
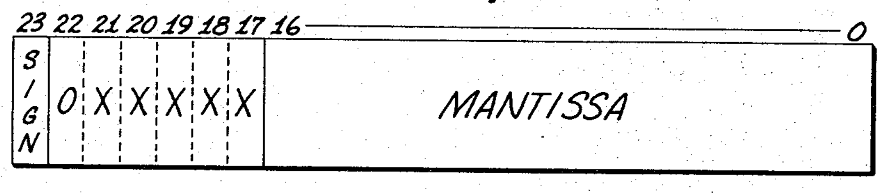

FIGS. 21*b*, 21*c* and 21*d* illustrate the form of exponent notation employed in the system. An exponent of zero is identified by a binary 1 in bit position 22 of the floating-point number and binary zeros in bit positions 21–17, as shown in FIG. 21*c*. A zero exponent is thus 40 in octal notation or 32 in decimal notation. The exponent of a positive floating-point number contains a binary 1 in bit position 22 with an additional binary 1 in at least one of bit positions 21–17, as shown in FIG. 21*b*. Thus, the exponent range of positive floating-point numbers is 41–77 in octal notation or 33–63 in decimal notation. The exponent of a negative floating-point number contains a binary zero in bit position 22 with appropriate binary digits in bit positions 21–17, as illustrated in FIG. 21*d*. Thus, the exponent range of negative floating-point numbers extends from 0 to 37 in octal notation of from 0 to 31 in decimal notation. This exponent notation permits floating-point numbers to be directly subtracted as binary numbers, without distinguishing between exponent and mantissa fields, when determining which of two floating-point numbers is the larger. The number 0 is represented by a zero exponent in conjunction with a zero mantissa.

FIG. 22 illustrates the major components of the Arithmetic and Control Unit 1, as shown in FIG. 5, which are employed to process floating-point numbers in the system. These major components are Parallel Adder Unit 20, A Register 21, Q Register 22, I Register 23, B Register 25, F Full Adder 27, J Counter 30 and Memory Data Register 33. In addition, FIG. 22 includes Instruction Decode 70, Remember Flip-Flop 71, Test Flip-Flop 72 and F Carry Flip-Flop 73.

I Register 23 receives the "Step Floating Point" or "SFP" command or the "GEN 3" command from memory during Sequence Control State 1, as described in the section "TIMING AND NORMAL SEQUENCE CONTROL STATES 1 AND 2." The organization of the Step Floating Point and GEN 3 command words is illustrated in FIG. 4. Instruction Decode 70 generates signal DSFP in response to the operation code of the Step Floating Point command in I Register 23 and signal DGN3 in response to the operation code of the GEN 3 command in I Register 23. Signals DSFP and DGN3 are applied to various components of the arithmetic and control unit to control operations called for by the corresponding command words.

B Register 25 receives data words, represented by signals FD00–FD23, from Memory Data Register 33 during performance of floating-point operations in the system. B Register 25 also has serial shifting capability, the contents of B Register 25 being applied to F Full Adder 27 during floating-point operations as sequential binary digits represented by signal FB00 and $\overline{\text{FB00}}$. During this shift, B Register 25 receives output signals from F Full Adder 27. The structure of B Register 25 and associated input gates is illustrated in flip-flop input logical schematic diagrams of FIGS. 23*a*–23*c*.

Referring to FIGS. 23*a*–23*c*, B Register 25 stores a data word from Memory Data Register 33 in response to gating signal BDOB. The contents of B Register 25 are serially shifted right in response to shift signals BSBL and BSBU, the contents of the register being shifted out of flip-flop B00. During the serial shift operation in B Register 25, the sum output signals FAFS and $\overline{\text{FAFS}}$ of F Full Adder 27 are applied to flip-flop B23, as indicated in the diagram.

Parallel Adder Unit 20 receives at its inputs signals FA00–23 from A Register 21 and $\overline{\text{FB00–FB23}}$ from B Register 25 during floating-point operations. Parallel Adder Unit 20 provides output signal $\overline{\text{DC22}}$ to Remember Flip-Flop 71. Parallel Adder Unit 20 subtracts the floating-point number in B Register 25 from the floating-point number in A Register 21 during execution of the Step Floating Point command to determine which of the floating-point numbers is the larger. The structure of Parallel Adder Unit 20 is illustrated by the logic diagrams of FIGS. 24*a* and 24*b*.

Figure 24A:
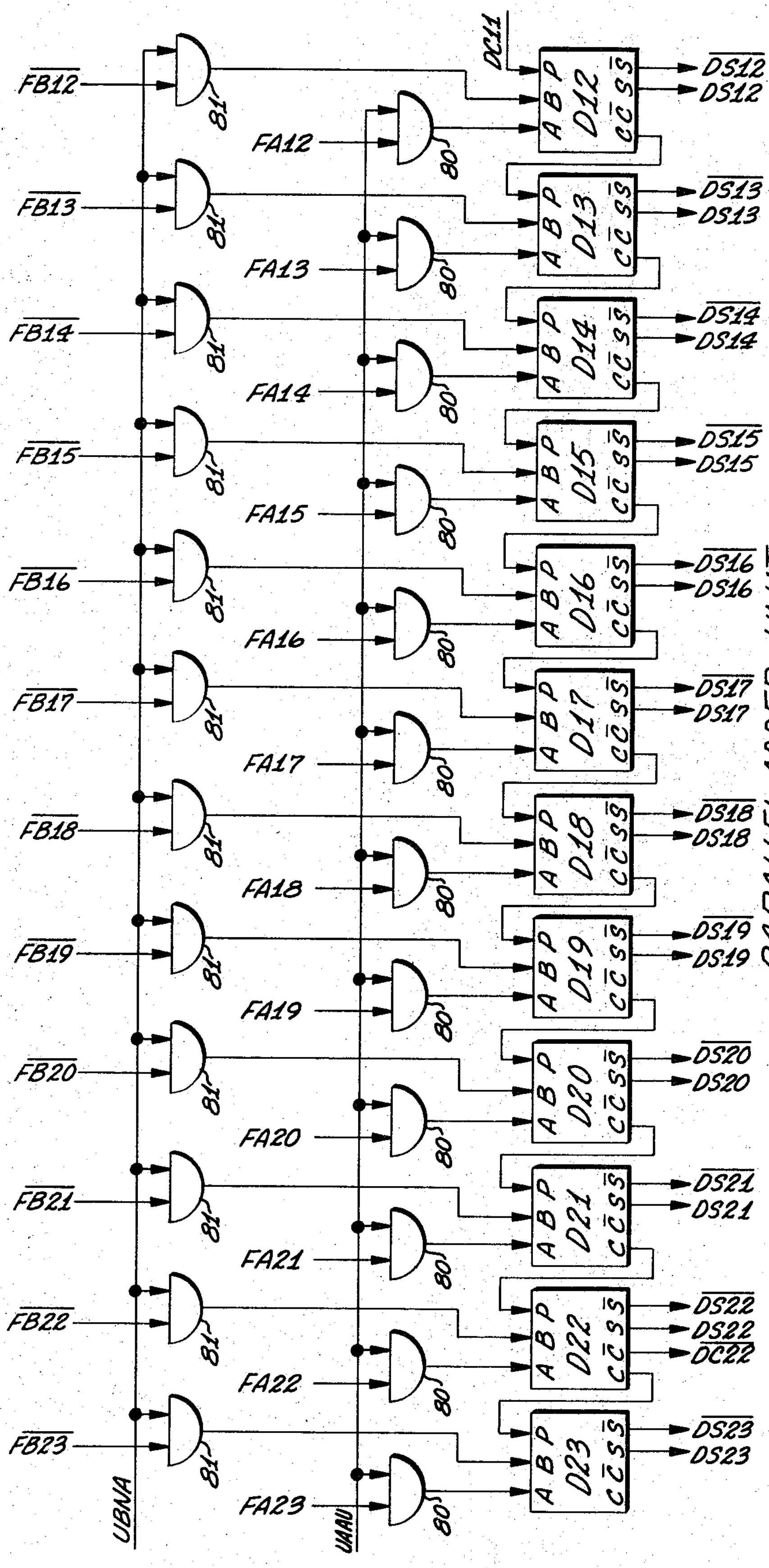
FIGS. 24*a* and 24*b* are logic diagrams of the Parallel Adder Unit employed in the system of FIG. 1.
Figure 24B:
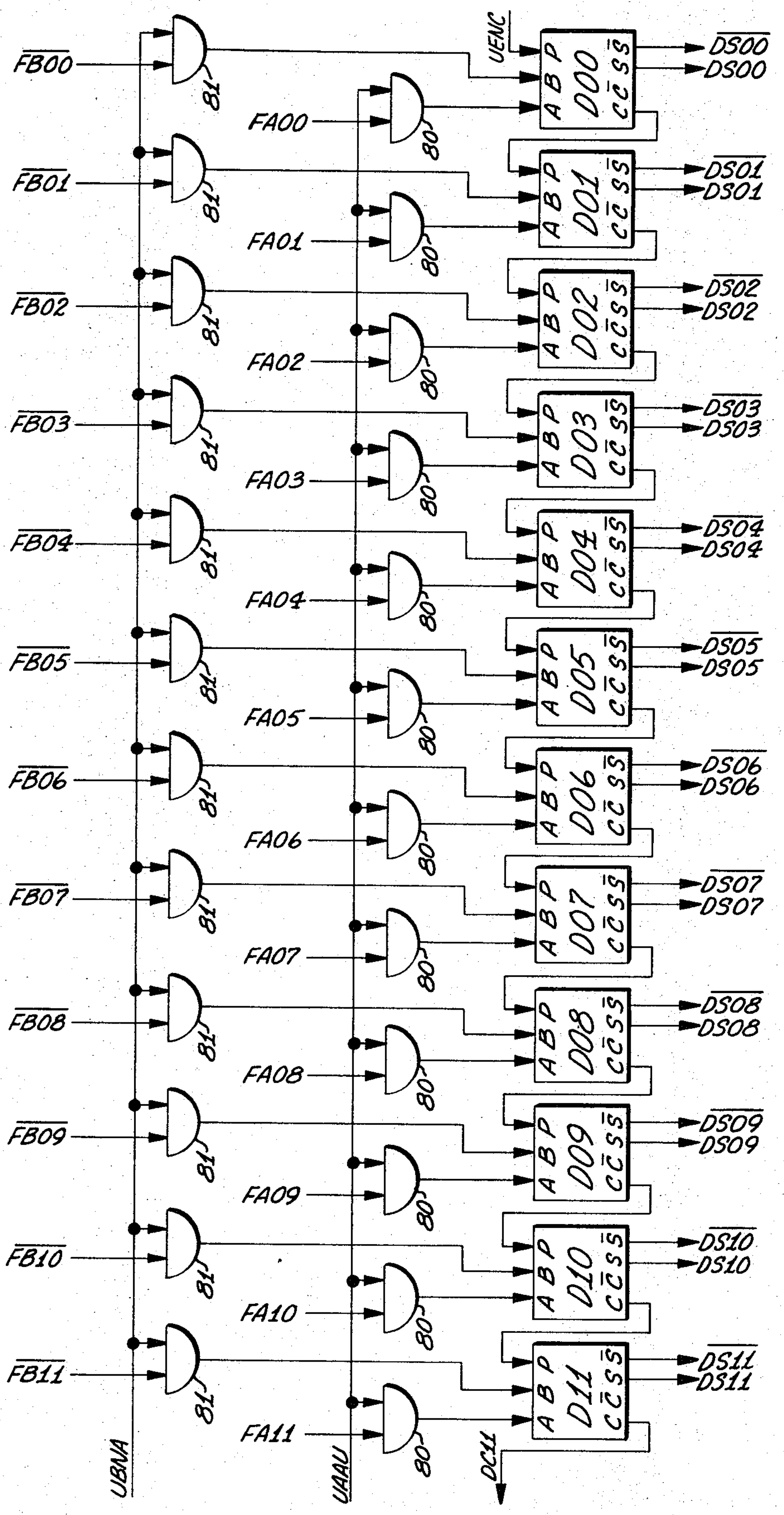

Referring to the logic diagrams of FIGS. 24*a* and 24*b*, Parallel Adder Unit 20 comprises full adders D00–D23 and associated input gates. The A inputs of full adders D00–D23 are provided by coresponding AND-gates 80 which receive output signals FA00–FA23 respectively of A Register 21 and gating signal UAAU. Similarly, the B inputs of full adders D00–D23 are derived from AND-gates 81 which receive output signals $\overline{\text{FB00–FB23}}$ respectively of B Register 25 and gating signal UBNA. The carry output of each of full adders D00–D22 is applied to the P input of the next higher-order full adder. Signal UENC comprises the P input to full adder D00. The sum and $\overline{\text{sum}}$ output signals of full adders D00–D23 are identified as DS00–23 and $\overline{\text{DS00–23}}$ respectively. The $\overline{\text{carry}}$ output signal $\overline{\text{DC22}}$ of full adder D22 is employed during execution of the Step Floating Point command to indicate the relative size of the floating-point numbers in A Register 21 and B Register 25.

A Register 21 has serial shifting capability and during certain floating-point operations, the contents of A Register 21 are applied to F Full Adder 27 as sequential binary digits represented by signal FA00 and $\overline{\text{FA00}}$. During these operations, Flip-Flop A23 of A Register 21 receives output signals FAFS and $\overline{\text{FAFS}}$ of F Full Adder 27. Flip-Flops A17–A21 of A Register 21 receive output signals $\overline{\text{FJ00–FJ04}}$ of J Counter 30. The structure A Register 21 and associated circuitry is illustrated in the flip-flop input logical schematic diagrams of FIGS. 25*a*–25*c*.

Figure 25A:
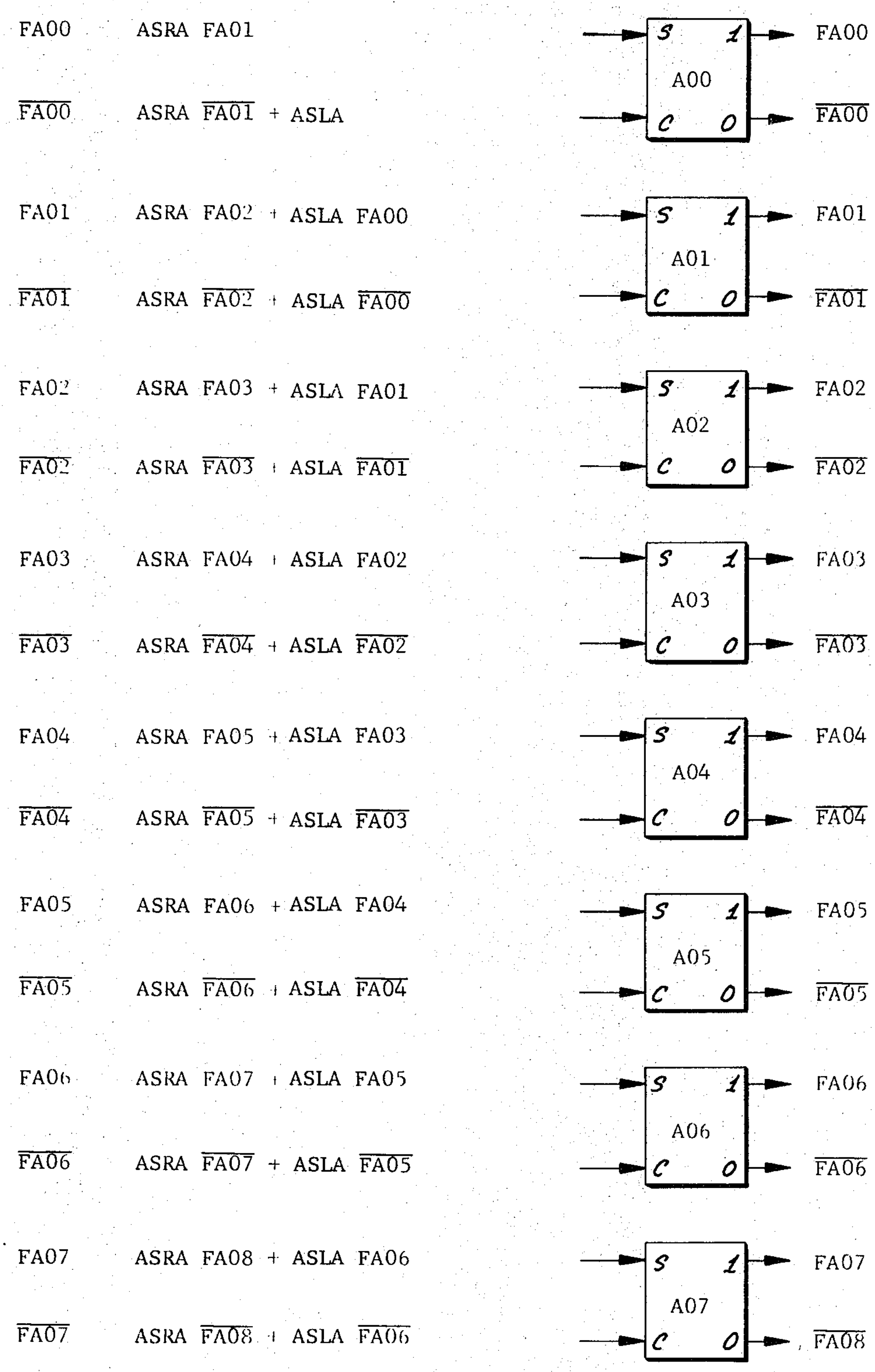
FIGS. 25*a*–25*c* are flip-flop input logical schematic diagrams of the A Register employed in the system of FIG. 1.
Figure 25B:
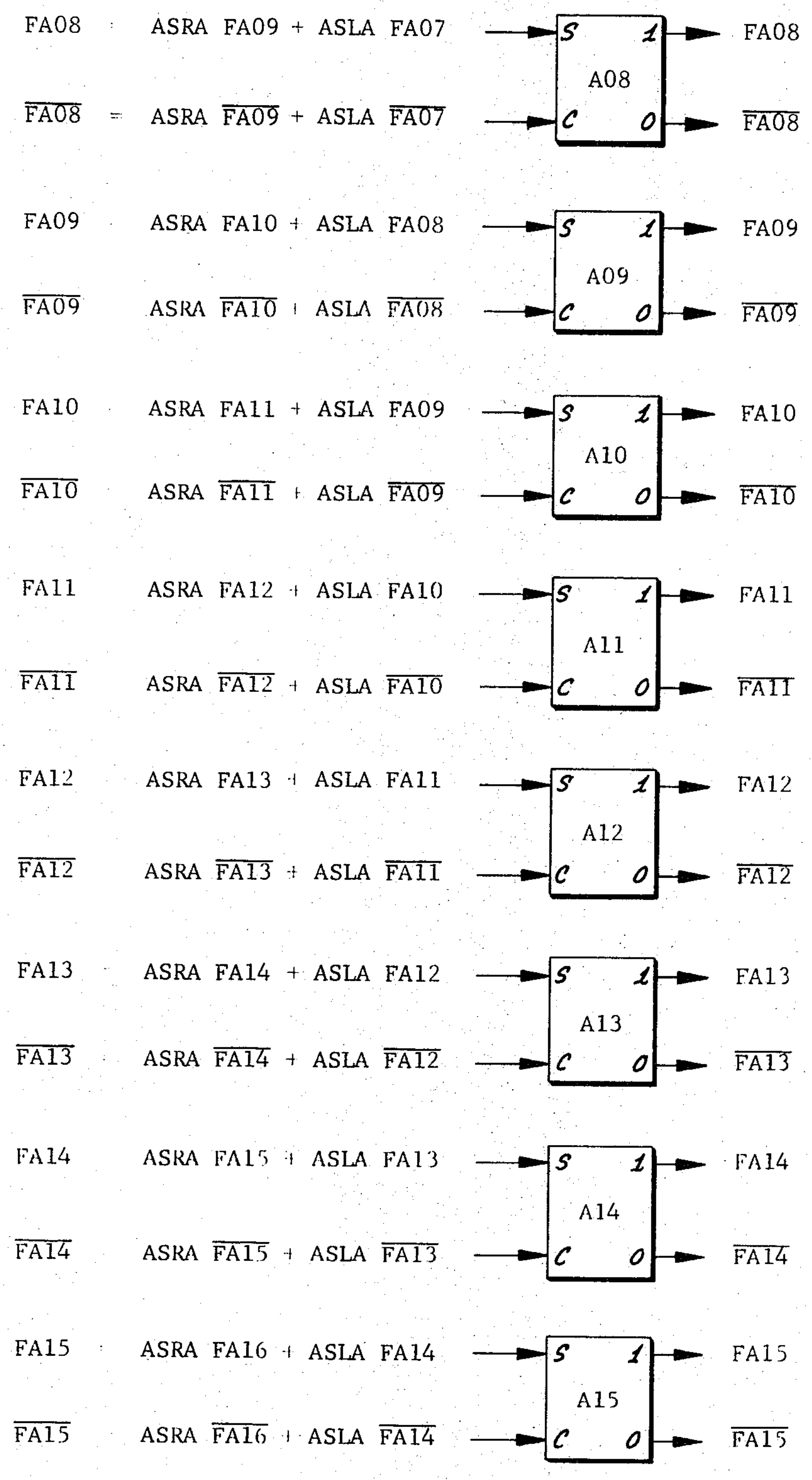
Figure 25C:
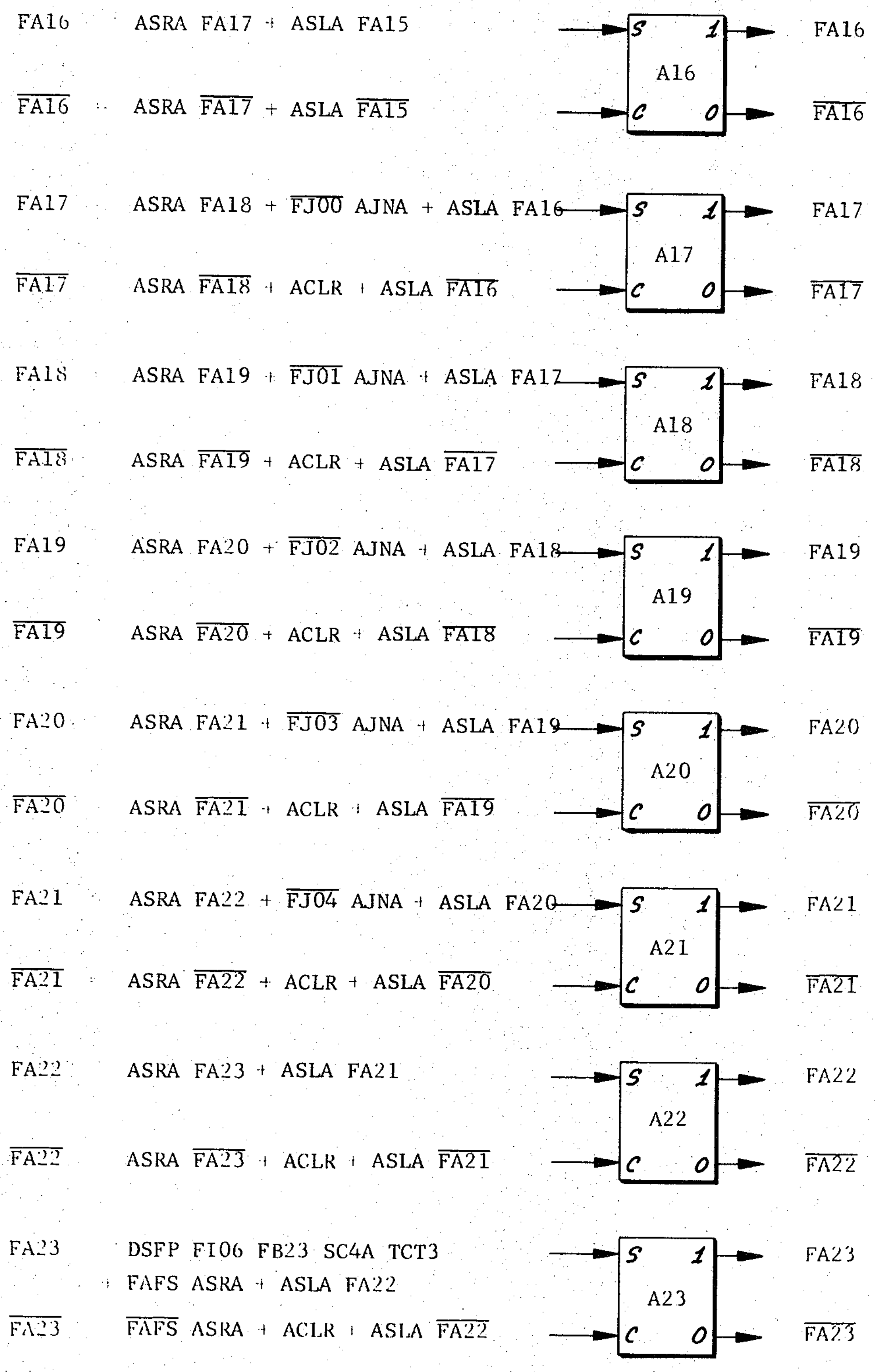

Referring to FIGS. 25*a*–25*c*, the contents of A Register 21 are serially shifted right in response to shift signal ASRA, the contents of A Register 21 being shifted out of Flip-Flop A00. The information shifted into Flip-Flop A23 during this right serial shift is derived from F Full Adder 27. A Register 21 is shifted left in response to shift signal ASLA. The complement of the count in J Counter 30 is transferred to Flip-Flops A17–A21 of A Register 21 in response to gating signal AJNA. Flip-Flop A23 of A Register 21 also receives input signal FB23 during execution of the Step Floating-Point command to control the sign of the floating-point number stored in A Register 21.

Figure 26:
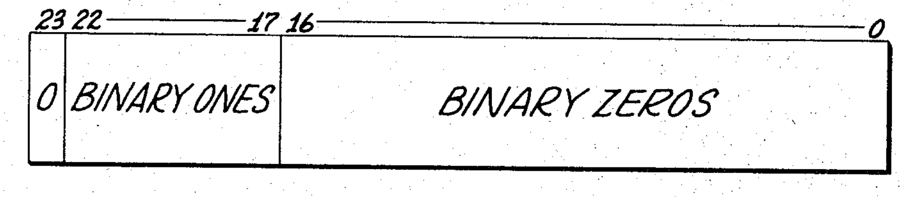
FIG. 26 is a symbolic diagram illustrating the contents, during floating-point operations of the Q Register employed in the system of FIG. 1.

Q Register 22 provides output signals to F Full Adder 21, Remember Flip-Flop 71 and F Carry Flip-Flop 73 during floating-point operations in the system, as shown in FIG. 22. The contents of Q Register 22 during execution of the Step Floating-Point command are illustrated in FIG. 26 (on same drawing as FIGS. 21*a*–21*d*). Q Register 22 contains a binary 0 in bit position 23 corresponding to the sign bit of a floating-point number, binary 1's in bit positions 22–17 corresponding to the exponent field of a floating-point number and binary 0's in bit positions 16–0 corresponding to the mantissa field of a floating-point number. The contents of Q Register 22 comprise a mask which is used to control operations performed on the exponents and mantissas of floating-point numbers. The structure of Q Register 22 and associated input logic is illustrated in the flip-flop input logical schematic diagrams of FIGS. 27*a*–27*c*.

Figure 27A:
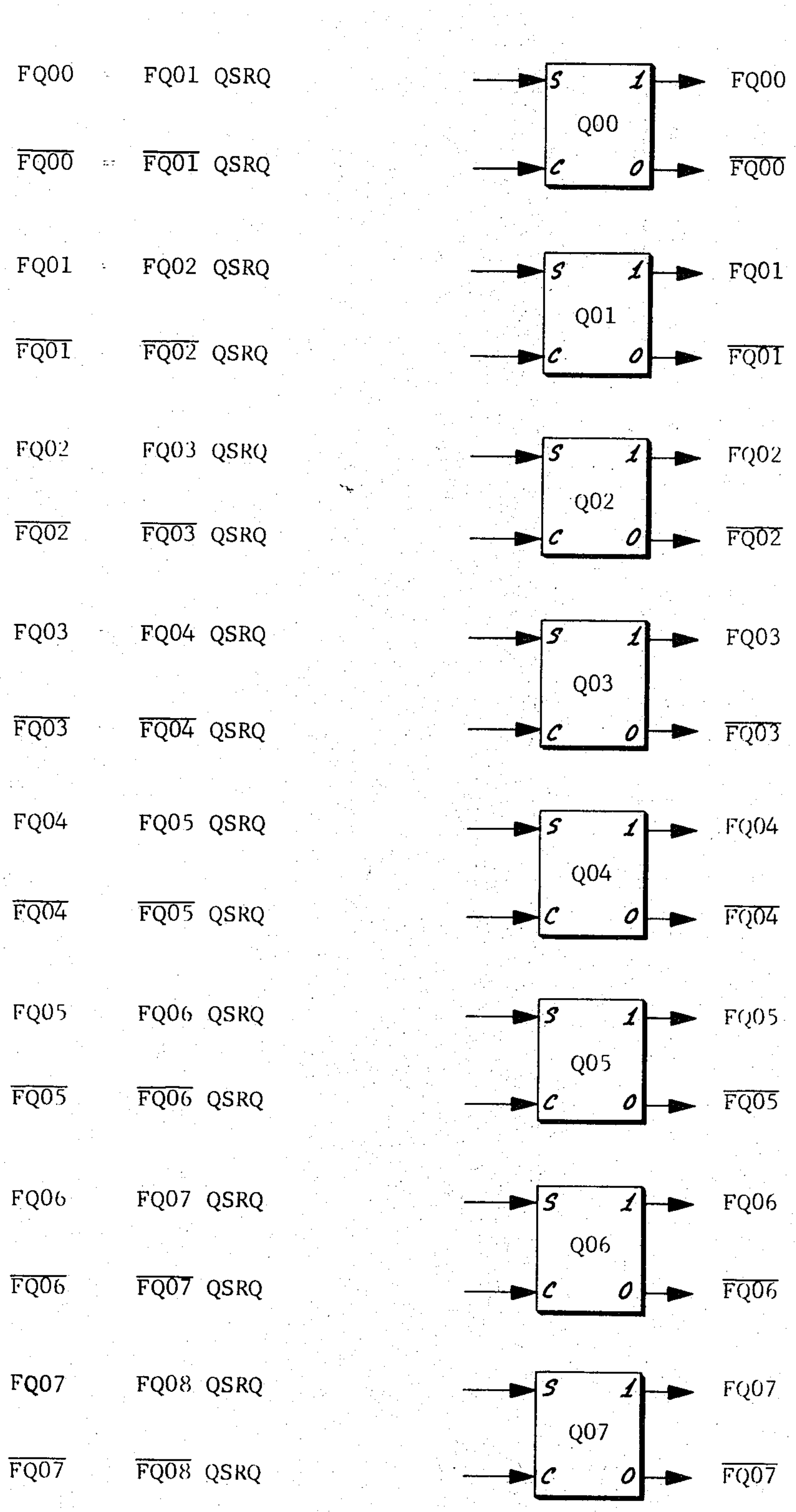
Figure 27C:
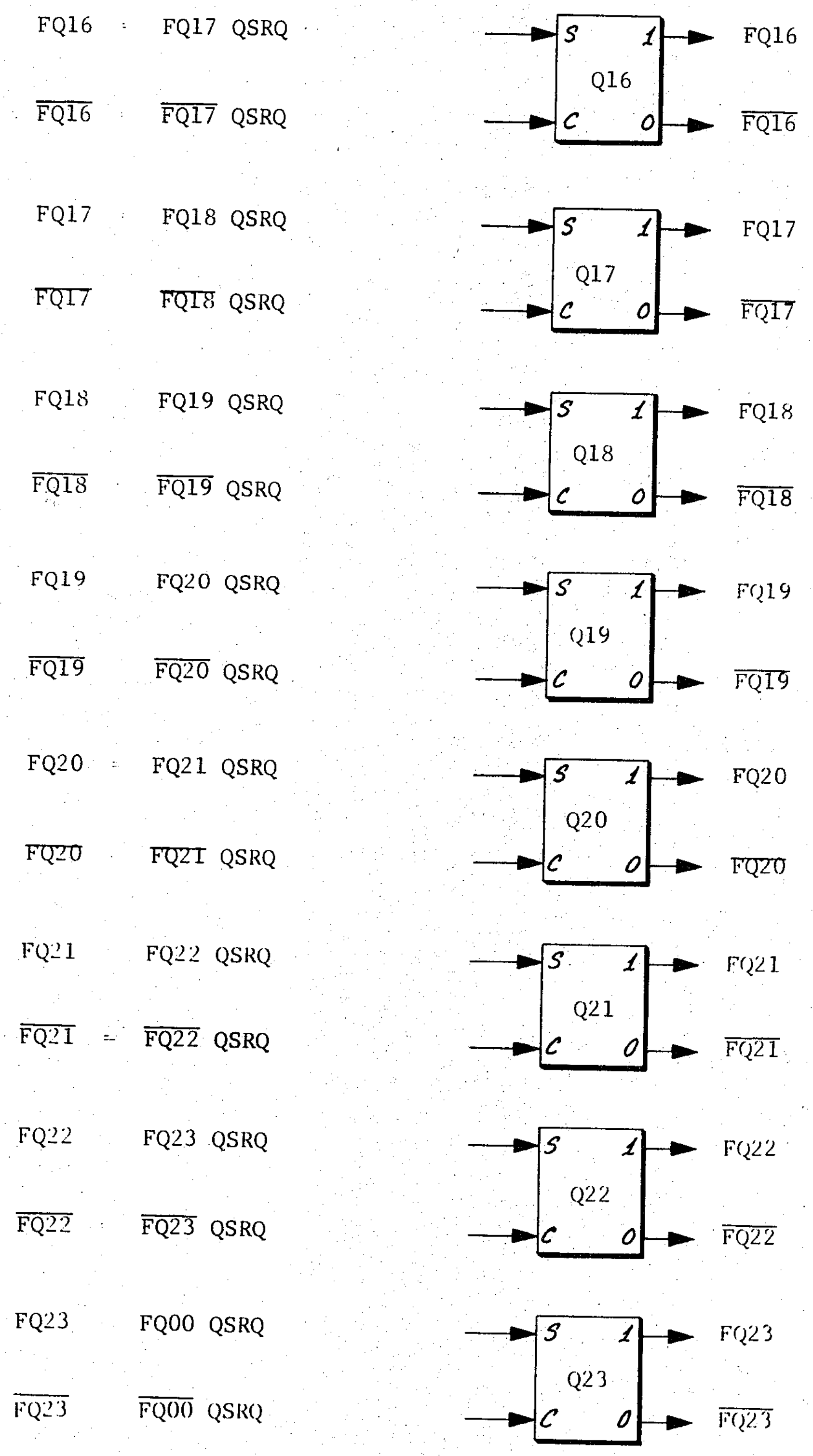

Referring to FIGS. 27*a*–27*c*, the contents of Q Register 23 are shifted right in response to shift signal QSRQ. The output Flip-Flop Q00 is taken as the output of Q Register 22 during the shift operation. The floating-point numbers in A Register 21 and B Register 25 are serially shifted through F Full Adder 27 under control of the mask in Q Register 22 to perform desired manipulations and arithmetic operations involving the floating-point numbers being operated upon by the Step Floating-Point command. The input to Flip-Flop Q23 during this shift operation is the output of flip-flop Q00. The contents of Q Register 22 are thus circular shifted.

J Counter 30 is employed to control or count the number of bit positions through which the mantissa of a floating-point number is shifted during floating-point operations J. Counter 30 receives signals $\overline{FA17–FA21}$ from A Register 21. The structure of J Counter 30 is illustrated in the flip-flop input logical schematic diagrams of FIG. 28. As shown in the diagrams, the complement of the contents of Flip-Flops A17–A21 of A Register 21 are transferred to J Counter 30 in response to gating signal JNAJ. The count in J Counter 30 is incremented in response to signal JINC.

F Full Adder 27 receives output signals FA00, $\overline{FA00}$ and FB00, $\overline{FB00}$ representing corresponding binary digits of the floating-point numbers in A Register 21 and B Register 25 respectively during floating-point operations in the system. The binary digits of the mask represented by output signals FQ00, $\overline{FQ00}$ of Q Register 22 are also applied in sequence to F Full Adder 27. The carry input to F Full Adder 27 is provided by F Carry Flip-Flop 73. F Full Adder 27 also receives signals representing binary digits of the command word in I Register 23.

Figure 29:
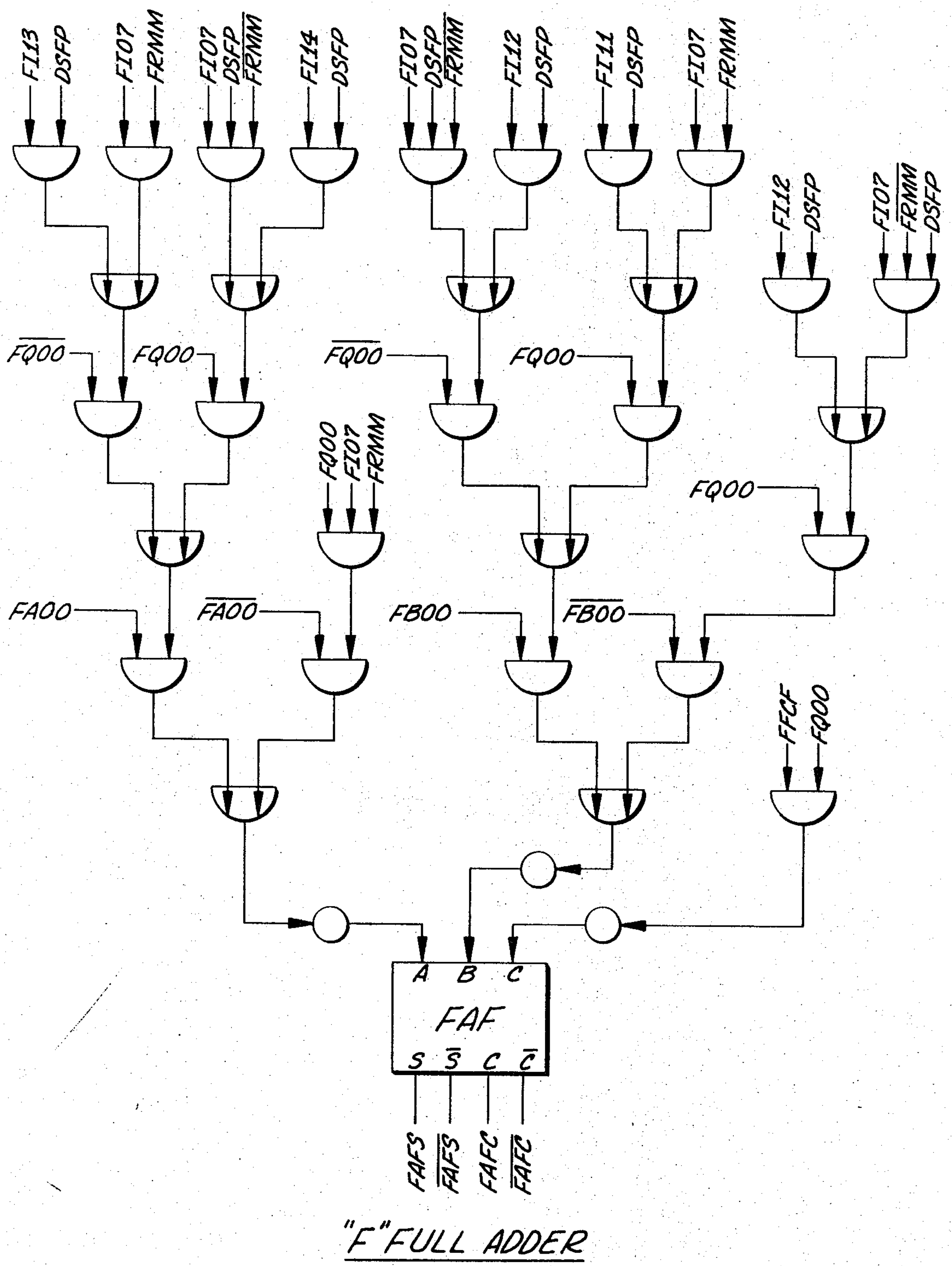
FIG. 29 is a logic diagram of the F Full Adder employed in the system of FIG. 1.

The structure of F Full Adder 27 comprising serial full adder FAF and associated input gates is illustrated in FIG. 29. Output signals FI07, FI13 and FI14 of I Register 23, output signals FRMM and $\overline{FRMM}$ of Remember Flip-Flop 71 and output signals FQ00 and $\overline{FQ00}$ of Q Register 2 control the application of output signals FA00 and $\overline{FA00}$ of A Register 21 to the A input of full adder FAF. Similarly, output signals FI07, FI11 and FI12 of I Register 23. FRMM and $\overline{FRMM}$ of Remember Flip-Flop 71 and FQ00 and $\overline{FQ00}$ of Q Register 22 control the application of output signals FB00 and $\overline{FB00}$ of B Register 25 to the B input of full adder FAF. The application of output signal FFCF of F Carry Flip-Flop 73 to the P input of full adder FAF is controlled by output signal FQ00 of Q Register 22.

Figure 30:
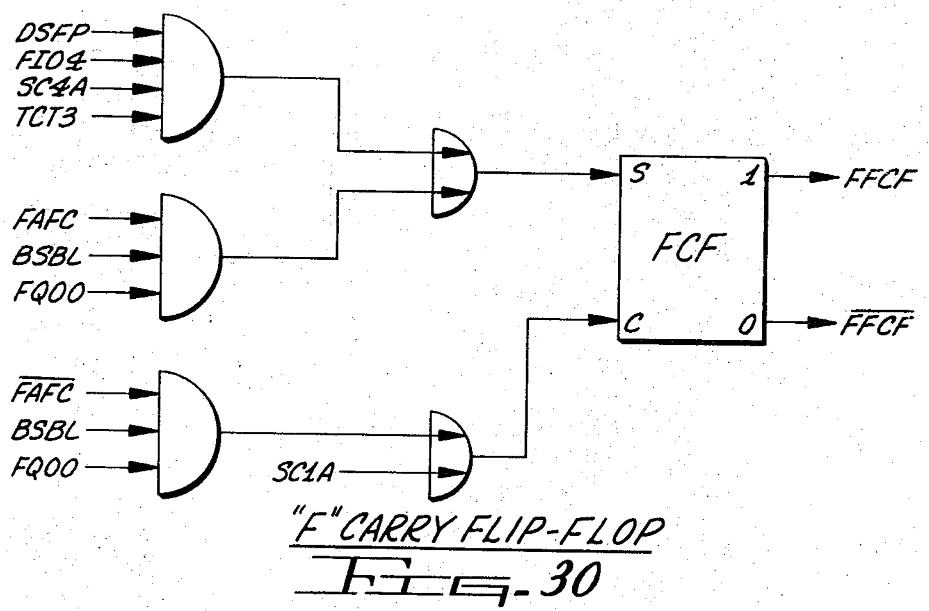
FIG. 30 is a logic diagram of the F Carry Flip-Flop employed in the system of FIG. 1.

F Carry Flip-Flop 73 functions to control carry inputs to F Full Adder 27 during floating-point operations. The structure of F Carry Flip-Flop 73 comprising flip-flop FCF and associated input gates is illustrated in FIG. 30. Flip-flop FCF is set to the 1-state at TCT3 time of Sequence Control State 4 during execution of the Step Floating Point command if bit 4 of the command word, as represented by output signal FI04 of I Register 23, is a binary 1. Flip-flop FCF is also set during the shifting of exponents into F Full Adder 27 if a carry occurs at the output of F Full Adder 27. Flip-flop FCF is reset to the 0-state during a shift of exponents through F Full Adder 27 if no carry occurs at the output of F Full Adder 27, as illustrated in FIG. 30.

Figure 31:
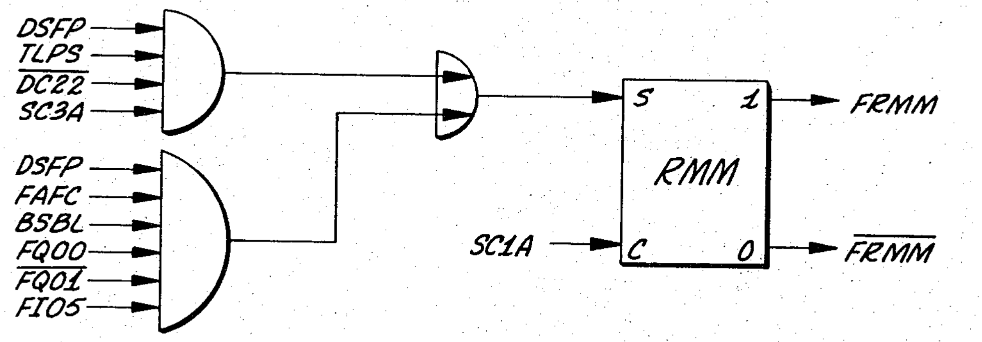
FIG. 31 is a logic diagram of the Remember Flip-Flop employed in the system of FIG. 1.

Remember Flip-Flop 71 is employed during comparison of the size of the floating-point numbers in A Register 21 and B Register 25 and is also used to control the sequence of instruction execution. The structure of Remember Flip-Flop 71 comprising flip-flop RMM and associated input gates is illustrated in FIG. 31. Flip-flop RMM is set to the 1-state at TLPS time during Sequence Control State 3 if the $\overline{carry}$ output signal $\overline{DC22}$ of Parallel Adder Unit 20 is a binary 1, indicating that the floating-point number in B Register 25 is greater than the floating-point number in A Register 21. Flip-flop RMM is also set to the 1-state during shifting of the last exponent digit of the floating-point numbers in the A and B Registers through F Full Adder 27 if a carry occurs at the output of Adder 27. Flip-flop RMM is reset to the 0-state during Sequence Control State 1.

Figure 32:
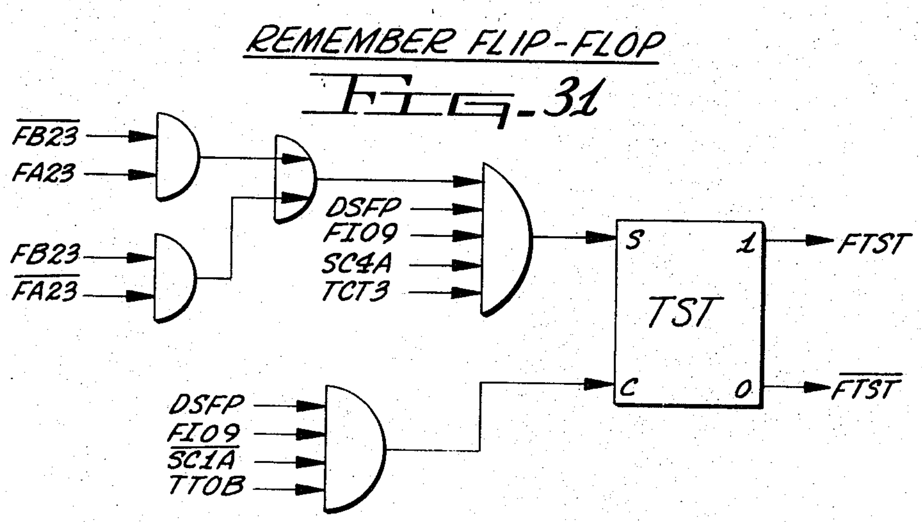
FIG. 32 is a logic diagram of the Test Flip-Flop employed in the system of FIG. 1.

Test Flip-Flop 72 serves to indicate a difference in signs between the floating-point numbers in A Register 21 and B Register 25. The structure of Test Flip-Flop 72 comprising flip-flop TST and associated input gates is illustrated in FIG. 32. Flip-flop TST is set to the 1-state at TCT3 time during Sequence Control State 4 if bit 9 of a Step Floating-Point command as represented by signal FI09 is a binary 1 and if signs of the floating-point numbers in A Register 21 and B Register 25 are opposite. Flip-flop TST is reset to the 0-state at a time determined by timing signal TTOB.

Miscellaneous logic and gating signals indicated in Block 75 issue at appropriate times during execution of the Step Floating-Point command. The logical schematic diagrams illustrating the logic structures generating these signals are provided in FIG. 33.

Step floating-point command word

The operations controlled by each of the microcoded bits of the Step Floating-Point command, summarized in FIG. 34, are as follows:

Bit 4.—Bit 4 of the Step Floating-Point command, as represented by output signal FI04 of I Register 23, sets F Carry Flip-Flop FCF to the 1-state prior to serial shifting of the contents of A Register 21, B Register 25 and Q Register 22. The state of flip-flop FCF does not affect the operation of F Full Adder 27 during the shifting of the mantissas of the floating-point numbers through the adder but provides a binary 1 input to F Full Adder 27 upon application of the lowest-order exponent bits thereto. Because one of the exponents is applied to F Full Adder 27 in one's complement form, the binary 1 input provided by F Carry Flip-Flop FCF forms the two's complement of the exponent of this floating-point number.

Bit 5.—When bit 5 of the Step Floating-Point command, as represented by output signal FI05 of I Register 23 in a binary 1, Remember Flip-Flop RMM is set to the 1-state when a field overflow condition occurs, as indicated by the existence of a carry when the highest-order exponent bits are shifted through F Full Adder 27. The state of Remember Flip-Flop RMM is subsequently used to control a program jump.

Bit 6.—When bit 6 of the Step Floating-Point command word, as represented by output signal FI06 of I Register 23, is a binary 1, the sign bit of the floating point number in A Register 21 is made a binary 1, indicating a negative sign, if the sign bit of the floating-point number in B Register 25 is a binary 1. Thus, a binary 1 is stored in flip-flop A23 of A Register 21 if either the sign bit of the floating-point number in A Register 21 or the sign bit of the floating-point number in B Register 25 is a binary 1.

Bit 7.—When bit 7 of the Step Floating-Point command word, as represented by output signal FI07 of I Register 23, is a binary 1, the states of Remember Flip-Flop RMM and flip-flop Q00 of Q Register 22 control the inputs to F Full Adder 27. If Remember Flip-Flop RMM is set to the 1-state, indicating that the floating-point number in B Register 25 is greater than the floating-point number in A Register 21, and if bit 4 of the Step Floating-Point Command word is a binary 1, so as to form the two's complement from the one's complement of the exponent of the floating-point number in A Register 21 applied to F Full Adder 27, the output of F Full Adder 27 comprises the mantissa of the floating-point number in A Register 21 and the difference between the exponents of the floating-point number in A Register 21 and B Register 25. The mantissa and exponent fields are identified during the operation in F Full Adder 27 by the mask in Q Register 22. This output of F Full Adder 27 is stored in A Register 21. If Remember Flip-Flop RMM is reset to the 0-state, indicating that the floating-point number in A Register 21 is greater than the floating-point number in B Register 25, and if bit 4 of the Step-Floating Point command word is a binary 1, causing the two's complement to be formed from the one's complement of the exponent of the floating-point number in B Register 25 applied to F Full Adder 27, the output of F Full Adder 27 comprises the mantissa of the floating-point number in B Register 25 and the difference in exponents of the floating-point numbers in A Register 21 and B Register 25. The mantissa and exponent fields are identified during this operation in F Full Adder 27 by the mask in Q Register 22. This output is stored in A Register 21.

Bit 8.—When bit 8 of the Step Floating-Point command word, as represented by output signal FI08 of I Register 23, is a binary 1, Sequence Control State 3 is entered after Sequence Control State 1, or after Sequence Control State 2 if indexing is required. During Sequence Control State 3, the floating-point number in B Register 25 is substracted in parallel from the floating-point number in A Register 21. This subtraction operation is performed in Parallel Adder Unit 20. If the floating-point number in B Register 25 is greater than the floating-point number in A Register 21. Remember Flip-Flop RMM is set to the 1-state. If the floating-point number in A Register 21 is greater than the floating-point number in B Register 25, Remember Flip-Flop RMM remains reset to the 0-state.

Bit 9.—If bit 9 of the Step Floating-Point command word, as represented by output signal FI09 of I Register 23, is a binary 1, and if the signs of the floating-point numbers in the A and B Registers are unlike, Test Flip-Flop TST is set to the 1-state. If the signs of the two floating-point numbers are alike, Test Flip-Flop TST remains rest to the 0-state. The state of Test Flip-Flop TST subsequently determines whether the two floating-point numbers are to be combined by subtraction (FTST) of by addition ($\overline{\mathrm{FTST}}$).

Bit 10.—If bit 10 of the Step Floating-Point command word, as represented by output signal FI10 of I Register 23, is a binary 1, and if Remember Flip-Flop RMM is set to the 1-state, the program count in P Register 24 is incremented an extra time to cause program control to be advanced to the second sequential command, omitting execution of the next sequential command. If bit 10 is a binary 0 or if Remember Flip-Flop RMM is reset to the O-state, no extra incrementation of the program count occurs and the next sequential command in the program sequence is executed.

Bit 11.—When bit 11 of the Step Floating-Point command word, as represented by output signal FI11 of I Register 23, is a binary 1, the exponent of the floating-point number in B Register 25 is applied to the B input of F Full Adder 27, under control of the mask in Q Register 22.

Bit 12.—When bit 12 of the Step Floating-Point command word, as represented by output signal FI12 of I Register 23, is a binary 1, the mantissa and the complement of the exponent of the floating-point number in B Register 25 are applied to the B input of F Full Adder 27.

Bit 13.—When bit 13 of the Step Floating-Point command word, as represented by output signal FI13 of I Register 23, is a binary 1, the mantissa of the floating-point number in A Register 21 is applied to the A input of F Full Adder 27.

Bit 14.—When bit 14 of the Step Floating-Point command word, as represented by output signal FI14 of I Register 23, is a binary 1, the exponent of the floating-point number in A Register 21 is applied to the A input of F Full Adder 27.

The following table illustrates the possible microcoded combinations of the Step Floating-Point command word and the resultant contents of A Register 21.

| Step Floating-Point Command Word Bits | | | | | Contents of a Register 21 | | | | | |
|---|---|---|---|---|---|---|---|---|---|---|
| | | | | | SFP Command Bit 7=0 | | A>B $\overline{\mathrm{FRMM}}$·SFB Bit 7=1 | | A<B FRMM·SFP Bit 7=1 | |
| 4 | 11 | 12 | 13 | 14 | FQ00=1 | FQ00=0 | FQ00=1 | FQ00=0 | FQ00=1 | FQ00=0 |
| 0 | 0 | 0 | 0 | 0 | 0 | 0 | A−B−1 | B | B−A−1 | A |
| 0 | 0 | 0 | 0 | 1 | A | 0 | A−B−1 | B | B−1 | A |
| 0 | 0 | 0 | 1 | 0 | 0 | A | A−B−1 | A+B | B−A−1 | A |
| 0 | 0 | 0 | 1 | 1 | A | A | A−B−1 | A+B | B−1 | A |
| 0 | 0 | 1 | 0 | 0 | $\overline{B}$ | B | A−B−1 | B | −A−2 | A+B |
| 0 | 0 | 1 | 0 | 1 | A−B−1 | B | A−B−1 | B | −2 | A+B |
| 0 | 0 | 1 | 1 | 0 | $\overline{B}$ | A+B | A−B−1 | A+B | −A−2 | A+B |
| 0 | 0 | 1 | 1 | 1 | A−B−1 | A+B | A−B−1 | A+B | −2 | A+B |
| 0 | 1 | 0 | 0 | 0 | B | 0 | A−1 | B | B−A−1 | A |
| 0 | 1 | 0 | 0 | 1 | A+B | 0 | A−1 | B | B−1 | A |
| 0 | 1 | 0 | 1 | 0 | B | A | A−1 | A+B | B−A−1 | A |
| 0 | 1 | 0 | 1 | 1 | A+B | A | A−1 | A+B | B−1 | A |
| 0 | 1 | 1 | 0 | 0 | −1 | B | A−1 | B | −A−2 | A+B |
| 0 | 1 | 1 | 0 | 1 | A−1 | B | A−1 | B | −2 | A+B |
| 0 | 1 | 1 | 1 | 0 | −1 | A+B | A−1 | A+B | −A−2 | A+B |
| 0 | 1 | 1 | 1 | 1 | A−1 | A+B | A−1 | A+B | −2 | A+B |
| 1 | 0 | 0 | 0 | 0 | 1 | 0 | A−B | B | B−A | A |
| 1 | 0 | 0 | 0 | 1 | A+1 | 0 | A−B | B | B | A |
| 1 | 0 | 0 | 1 | 0 | 1 | A | A−B | A+B | B−A | A |
| 1 | 0 | 0 | 1 | 1 | A+1 | A | A−B | A+B | B | A+B |
| 1 | 0 | 1 | 0 | 0 | −B | B | A−B | B | −A−1 | A+B |
| 1 | 0 | 1 | 0 | 1 | A−B | B | A−B | B | −1 | A+B |
| 1 | 0 | 1 | 1 | 0 | −B | A+B | A−B | A+B | −A−1 | A+B |
| 1 | 0 | 1 | 1 | 1 | A−B | A+B | A−B | A+B | −1 | A |
| 1 | 1 | 0 | 0 | 0 | B+1 | 0 | A | B | B−A | A |
| 1 | 1 | 0 | 0 | 1 | A+B+1 | 0 | A | B | B | A |
| 1 | 1 | 0 | 1 | 0 | B+1 | A | A | A+B | B−A | A |
| 1 | 1 | 0 | 1 | 1 | A+B+1 | A | A | A+B | B | A+B |
| 1 | 1 | 1 | 0 | 0 | 0 | B | A | B | −A−1 | A+B |
| 1 | 1 | 1 | 0 | 1 | A | B | A | B | −1 | A+B |
| 1 | 1 | 1 | 1 | 0 | 0 | A+B | A | A+B | A−1− | A+B |
| 1 | 1 | 1 | 1 | 1 | A | A+B | A | A+B | −1 | A+B |

Floating-point arithmetic operations

Multiplication of two floating-point numbers is performed by multiplying the mantissas and adding the exponents. The resulting mantissa and exponent represent the product of the two floating-point numbers. Division of two floating-point numbers is performed by dividing the mantissa of the dividend by the mantissa of the divisor and by subtracting the exponent of the divisor from that of the dividend. The resulting mantissa and exponent represent the quotient.

Addition or substration of floating-point numbers requires that the numbers be properly aligned, i.e. the exponent values of the two floating-point numbers must be identical. To align the numbers, the numbers are compared to determine which has the larger exponent. The mantissa of the smaller number is shifted to the right the number of places specified by the difference between the two exponents. With each shift of the mantissa, the smaller exponent is incremented, resulting in identical exponent values for the two floating-point numbers. To perform an addition, the mantissas are added, the sum of the two floating-point numbers being represented by the common exponent and sum of the mantissas. To perform a subtraction, the mantissa of the subtrahend is subtrated from the mantissa of the minuend, the result of the subtraction of the two floating-point numbers being represented by the common exponent and the difference between the mantissas.

Precision during floating-point arithmetic operations is optimized by normalizing the floating-point numbers. The floating-point numbers are normaly initially stored in memory in normalized form. The results of arithmetic operations on floating-point numbers are normalized prior to transfer to memory. A floating-point number is normalized by shifting the mantissa left until its most-significant bit is a binary 1, the exponent being decremented by 1 for each position through which the mantissa is shifted left.

Floating-point arithmetic operations are normally performed in a digital computer system under control of a program or subroutine comprising a series of commands. The floating-point add and subtract subroutines utilized in the disclosed system, including the command of the invention, are summarized below:

| Command Mnemonic | Command word octal | Operation |
|---|---|---|
| LDQ | | The mask illustrated in FIG. 26 is transferred from memory to Q Register 22. |
| LDX | | A first normalized floating-point number is stored in memory storage location 2. |
| LDA | | A second normalized floating-point number is transferred from memory to A Register 21. |
| SPF | 01003620 | The floating-point number in memory storage location 2 is compared with the floating-point number in A Register 21. The mantissa of the smaller floating-point number is stored in A Register 21. The exponent of the smaller floating-point number is subtracted from the exponent of the larger floating-point number and the difference stored in the exponent field of A Register 21. Test Flip-Flop TST is set to the 1-state if the signs of the two floating-point numbers are unlike. If the floating-point number in A Register 21 was greater, the next command LDX in the program sequence is executed; however, if the floating-point number in memory storage location 2 was greater, the program count in P Register 24 receives an extra incrementation and the next instruction to be executed is GEN 3. |
| LDX | | The floating-point number in memory storage location 2 is replaced with the floating-point number in A Register 21, so that memory storage location 2 contains the larger of the two floating-point numbers. |
| GEN 3 | 45020037 | The mantissa of the smaller floating-point number in A Register 21 is shifted right a number of places specified by the exponent difference] in the exponent field of A Register 21. If the exponent difference in A Register 21 is greater than 31, the next instruction BRU in the program sequence is executed. If the exponent difference in A Register 21 is less than 31, the program count in P Register 24 receives an extra incrementation and the second sequential instruction STA is executed next. |
| BRU | | The floating-point routine is terminated and the program branches to a correction subroutine. |
| STA | | The shifted mantissa of the smaller floating-point number in A Register 21 is stored in a selected memory storage location. |
| LDA | | The larger of the two floating-point numbers is transferred from memory storage location 2 to A Register 21. |
| ANA | | The exponent field of A Register 21 is cleared, leaving the mantissa of the larger floating-point number in the mantissa field of A Register 21. |
| BTS | | The state of the Test Flip-Flop TST is checked; if TST is set to the 1-state indicating that the two floating-point numbers have unlike signs, the program branches to the subtract subroutine, beginning with command SUB. If Test Flip-Flop TST is reset to the 0-state, indicating that the floating-point numbers have like signs, the first command ADD of the add subroutine is next executed. |
| | | Add Subroutine |
| ADD | | The larger mantissa in A Register 21 is added to the smaller mantissa stored in the selected memory storage location. The result is stored in the mantissa field of A Register 21. |
| GEN 3 | 45040037 | If a carry occurred during addition of the most-significant digits of the two mantissas, the mantissa of the result is shifted right one bit position and the next sequential command ORA is next executed. If no carry occurred during addition of the mantissas, the program count in P Register 24 receives an extra incrementation and the second sequential command SFP is next executed. |
| ORA | | A binary 1 is stored in bit position 17 of the exponent field in A Register 21 to indicate that the result mantissa was shifted right one place and that the result exponent must be incremented by 1. |
| SFP | 01066140 | If the sign of the floating-point numbers was minus, a binary 1 is stored in the sign bit position of A Register 21 to indicate that the sign of the result is minus. The exponent of the larger floating-point number in memory storage location 2 is added to the contents of the exponent field and mantissa fields of A Register 21, the result being stored in A Register 21. The exponent of the result is therefore automatically corrected if a binary 1 was stored in bit position 17 of the A Register exponent field during execution of command ORA. A Register 21 therefore contains the normalized result of the floating-point addition. If a carry occurs during the addition, indicating an overflow from the exponent field, the program count in P Register 24 receives an extra incrementation, causing the second sequential BRU command to be executed. If no carry occurs, the next sequential BRU command is executed. |
| BRU | | The floating-point operation is completed and a branch is made to the main program. |
| BRU | | An overflow indicating a scale problem has occurred and a branch is taken to a correction subroutine. |
| | | Subtract Subroutine |
| SUB | | The smaller mantissa stored in the selected memory location is subtracted from the larger mantissa in A Register 21. The result is stored in the mantissa field of A Register 21. |
| GEN 3 | 45012037 | The result mantissa in A Register 21 is shifted left until the most significant bit in the mantissa field (Flip-Flop A16) is a binary 1 or until 31 shifts have occurred, the count in J Counter 30 being incremented each time a shift occurs. The complement of the final count in J Counter 30 is transferred to bit positions 21–17 of A Register 21. If the count in J Counter 30 is 31, a scale problem is indicated and the next sequential command BRU is executed. Otherwise, the program count in P Register 24 receives an extra incrementation and the second sequential command SFP is executed next. |

| Command Mnemonic | Command word octal | Operation |
|---|---|---|
| BRU | | Branch to error subroutine and terminate floating-point subroutine. |
| SFP | 01061660 | If the sign of the larger floating-point number is minus, a binary 1 representing a minus sign is stored in the sign bit position of A Register 21. The shift count of J Counter 30, the complement of which is stored in the exponent field in A Register 21, is subtracted from the exponent of the larger floating-point number stored in memory storage location 2. The result representing the correct exponent of the remainder number, is stored in the exponent field of A Register 21. A Register 21 thus contains the mantissa, exponent and sign representing the difference between the larger and smaller floating-point numbers. If a carry occurs during subtraction of the count from J Counter 30 from the exponent of the larger floating-point number, an underflow indicating a scale problem has occurred and the program count in P Register 24 receives an extra incrementation, causing the second sequential command BRU to be executed next. If no scale problem is indicated, the next sequential BRU command is executed. |
| BRU | | The floating-point operation is completed and a branch is made to the main program. |
| BRU | | A scale problem has occurred and a branch is made to a correction subroutine. |

Step floating-point command execution

The Step Floating-Point command is advantageously employed in floating-point operations. The command conserves memory space and processing time. A description of operation of the computer system in response to each of the Step Floating-Point commands listed in the section "FLOATING-POINT ARITHMETIC OPERATIONS" is presented below:

SFP Command 01003620.—Bits 4, 7, 8, 9 and 10 of the Step Floating-Point command word are binary 1's in this microcoded version of the command. At the beginning of execution of the command, A Register 21 and memory storage location 2 contain normalized floating-point numbers. Referring to the timing diagram of FIG. 35, the step floating-point command word is transferred from memory to I Register 23 and the program count in P Register 24 is incremented during Sequence Control State 1, represented by signal SC1A, as described in the section entitled "TIMING AND NORMAL SEQUENCE CONTROL STATES 1 AND 2."

Sequence Control State 3, identified by signal SC3A, is entered in accordance with the conditions specified in the following logical schematic diagram:

SC03=DSFP DS08 (DX00 SC01 TLPS+SC02 TLPS)

Sequence Control State 3 is entered only if signal DS08 is present. Signal DS08 represents bit 8 of the Step Floating-Point command at the output of Parallel Adder Unit 20. If signal DX00 issues, indicating that bits 15–17 of the SFP command are binary zeros and that no index modification is to occur, the system enters Sequence Control State 3 immediately after completion of Sequence Control State 1, if bit 8 of the SFP command word is a binary 1. If signal $\overline{DX00}$ issues, indicating that index modification is called for by bits 15–17 of the SFP command, Sequence Control State 3 is entered upon completion of Sequence Control State 2, not illustrated in FIG. 35, if bit 8 of the SFP command word is a binary 1.

Figure 35:
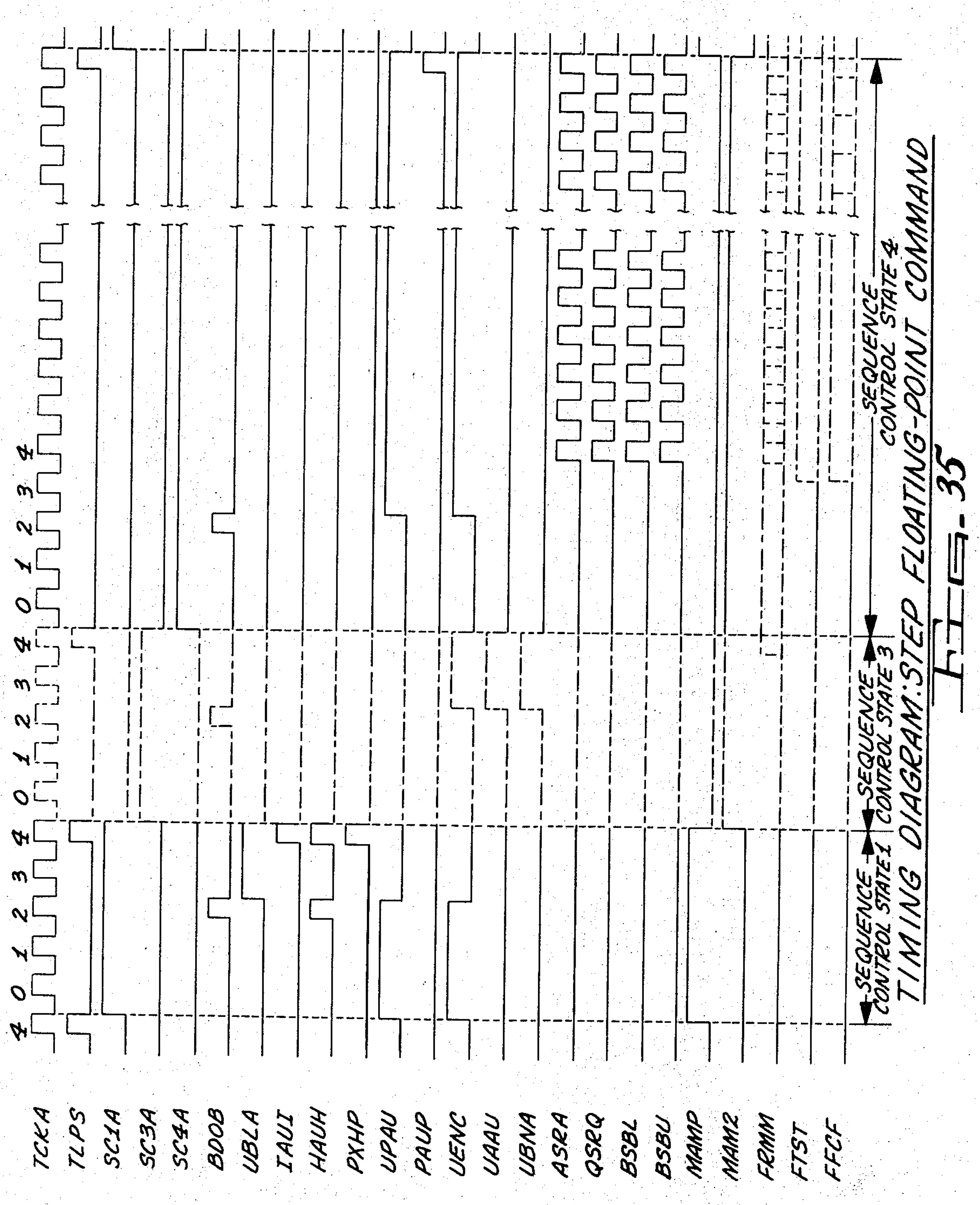
FIG. 35 is a timing diagram illustrating the operation of the apparatus of the invention.

Signal MAM2 issues at the beginning of Sequence Control State 3, as shown in FIG. 35, to transfer the address of memory storage location 2 to Memory Address Register 32. The normalized floating point number in storage location 2 is transferred from Memory Data Register 33 to B Register 25 in response to signal BD0B. Signal UBNA then issues to apply the one's complement of the floating-point number in B Register 25 to the inputs of Parallel Adder Unit 20. Signal UENC also issues to apply a one to the lowest-order full adder of Parallel Adder Unit 20, thereby forming the two's complement of the floating-point number from B Register 25. Signal UAAU issues to apply the normalized floating-point number in A Register 21 to the inputs of Parallel Adder Unit 20. Parallel Adder Unit 20 thus subtracts the normalized floating-point number in B Register 25 from the normalized floating-point number in A Register 21. If signal $\overline{DC22}$ issues, indicating the absence of a carry from Full Adder D22, the floating-point number in B Register 25 is larger than the floating-point number in A Register 21. Remember Flip-Flop RMM is set to the 1-state in response to signal $\overline{DC22}$. The state of Remember Flip-Flop RMM thus indicates the relative magnitude of the floating-point numbers in A Register 21 and B Register 25.

The system next enters Sequence Control State 4, as represented by signal SC4A in the timing diagram of FIG. 34. In response to bit 9 of the SFP command word, Test Flip-Flop TST is set to the 1-state during TCT3 time if the floating-point numbers in A Register 21 and B Register 25 have unlike signs. F Carry Flip-Flop FCF is set to the 1-state at TCT3 time in response to bit 4 of the SFP command word.

In response to bit 7 of the SFP command word, the exponent of the smaller floating-point number is serially subtracted from the exponent of the larger floating-point number in F Full Adder 27 and the exponent remainder and the mantissa of the smaller floating-point number are stored in A Register 21. This operation occurs in response to the mask in Q Register 22, which indicates whether the binary digits of the floating-point numbers in A Register 21 and B Register 25 represented by signals FA00, $\overline{FA00}$ and FB00, $\overline{FB00}$ respectively correctly being applied to F Full Adder 27 are mantissa or exponent bits, and in response to the state of Remember Flip-Flop RMM which indicates which of the two floating-point numbers is larger. Serial shifting of the floating-point numbers in A Register 21 and B Register 25 and of the mask in Q Register 22 to the inputs of F Full Adder 27 is effected under control of shift signals ASRA, QSRQ, BSBU and BSBL, each of which issues 24 times in succession during Sequence Control State 4 to cause the entire contents of A Register 21, Q Register 22 and B Register 25 to be shifted to the inputs of F Full Adder 27.

Referring to FIG. 29 and to that portion of FIG. 34 relating to bit 7 of the SFP command, the mantissa of the floating-point number in A Register 21 is shifted unchanged through F Full Adder 27 back to A Register 21 if Remember Flip-Flop RMM is set to the 1-state, indicating that the floating-point number in B Register 25 is the larger. The mantissa of the floating-point number in B Register 25 is shifted unchanged through F Full Adder 27 into A Register 21 if Remember Flip-Flop RMM is reset to the 0-state, indicating that the floating-point number in A Register 21 is the larger. Signal $\overline{FQ00}$, which is a binary 1 during shifting of the mantissa fields of F Full Adder 27, inhibits the performance of an arithmetic operation on the mantissa of the smaller floating-point number as it is transmitted through F Full Adder 27 to A Register 21.

When signal FQ00 is a binary 1, indicating that the exponents of the floating-point numbers are being applied to the inputs of F Full Adder 27, the state of Remember Flip-Flop RMM controls F Full Adder 27. If Remember Flip-Flop RMM is set to the 1-state, the one's complement of the exponent of the floating-point number in A Register 21 is applied to the input of F Full Adder 27. Input signal FFCF of F Carry Flip-Flop 73 provides an additional input to F Full Adder 27, forming the two's complement of the exponent from A Register 21. The exponent of the floating-point number in B Register 25 is also applied to F Full Adder 27. The result of the subtraction of the exponent of the floating-point number in A Register 21 from the exponent of the floating-point number of B Register 25 is stored in A Register 21.

If Remember Flip-Flop RMM is reset to the 0-state, the two's complement of the exponent of the floating-point number in B Register 25 is formed and the result of the subtraction of the B Register exponent from the A Register exponent is stored in A Register 21. Therefore, after completion of the shift of the contents of A Register 21, Q Register 22 and B Register 25 through F Full Adder 27, the mantissa field of A Register 21 contains the mantissa of the smaller floating-point number and the exponent field of A Register 21 contains the difference between the exponents of the two floating-point numbers.

At time TCT2 of Sequence Control State 4, the program count in P Register 24 is applied to Parallel Adder Unit 20 along with signal UENC, causing an incremented program count to appear at the output of Parallel Adder Unit 20. If Remember Flip-Flop RMM was set to the 1-state during Sequence Control State 3, indicating that the floating-point number in B Register 25 is greater than the floating-point number in A Register 21, signal PAUP issues at time TLPS to transfer the incremented program count to P Register 24. Thus, if the floating-point number in B Register 25 is larger than the floating-point number in A Register 21, the program count in P Register 24 is incremented twice during execution of the SFP command.

SFP Command (01066140).—Microcoded bits 5, 6, 10, 11, 13 and 14 of the Step Floating-Point Command are set to the 1-state in this microcoded version of the Step Floating-Point Command. At the beginning of execution of this SFP command, A Register 21 contains the normalized sum mantissa resulting from an addition operation and a binary 1 is stored in bit position 17 of A Register 21 if correction of the exponent is required. During execution of this SFP command, the system does not enter Sequence Control State 3 but goes to Sequence Control State 4 directly from either Sequence Control States 1 or 2, since bit 8 of the command word is a binary 0.

In response to bit 6, Flip-Flop A23 of A Register 21 is set to the 1-state if Flip-Fop B23 of B Register 25 is set to the 1-state. Thus, if the sign of the floating-point words is minus, a binary 1 is stored in the sign bit position of A Register 21. In response to bits 11, 13 and 14 of the SFP command word, the contents of A Register 21, the mask in Q Register 22 and the exponent in B Register 25 are serially shifted into the inputs of F Full Adder 27, as summarized in FIG. 34. The output of F Full Adder 27 comprising the result mantissa and the result exponent is stored in A Register 21. In response to bit 5 of the SFP command, Remember Flip-Flop RMM is set to the 1-state if a carry occurs out of the exponent field during the serial shift through F Full Adder 27. In response to bit 10 of the SFP command, an extra incrementation of the program count in P Register 24 is effected if Remember Flip-Flop RMM is set to the 1-state, as described with reference to Step Floating-Point Command (01003620).

SFP Command (01066160).—Bits 4, 5, 6, 10, 11, 13 and 14 are binary one's in this version of the SFP command. The mantissa field of A Register 21 contains the normalized result of the subtraction of the mantissa of the smaller floating-point number from the mantissa of the larger floating-point number while the exponent field of A Register 21 contains the complement of the count representing the number of positions through which the result mantissa was shifted left to enter it normalized. Sequence Control State 1 is identical to that of SFP Command 01003620 and the system does not enter Sequence Control State 3.

During execution of this SFP command, the larger floating-point number is transferred from memory storage location 2 to B Register 25. In response to bit 4 of the SFP command, F Carry Flip-Flop 73 is set to the 1-state at TCT3 Time of Sequence Control State 4. Otherwise, the execution of this SFP command is identical to SFP Command 01066140. During the serial shift of the contents of A Register 21, Q Register 22 and B Register 25 to the inputs of F Full Adder 27, the shift count in the exponent field of A Register 21 is subtracted from the exponent of the larger floating-point number in B Register 25. Upon completion of the shift operation, A Register 21 contains the normalized mantissa and the exponent of the result.

What is claimed is:

1. In apparatus for processing floating-point numbers, each floating-point number comprising a mantissa and an exponent, the combination comprising: first storage means having a first portion for storing a binary representation of the mantissa of a first floating-point number and a second portion for storing a binary representation of the exponent of the first floating-point number, the representation of the exponent comprising a plurality of binary digits including a most-significant digit, said most-significant digit being a binary 1 when the exponent is positive and a binary 0 when the exponent is negative, said most-significant number being a binary 1 with the remaining binary digits of the exponent being binary 0's when the floating-point number is zero, second storage means including a first portion for storing a binary representation of the mantissa of a second floating-point number and a second portion for storing a binary representation of the exponent of the second floating-point number, the representation of the exponent comprising a plurality of binary digits including a most-significant digit, said most-significant digit being a binary 1 when the exponent is positive and a binary 0 when the exponent is negative, said most-significant digit being a binary 1 with the remaining binary digits of the exponent being binary 0's when the floating-point number is zero, comparison means for simultaneously receiving the exponents and the mantissas of two floating-point numbers and for determining the larger of the two numbers, said comparison means including output means for providing a first output signal if the first floating-point number is the larger and for providing a second output signal if the second floating-point number is larger, bistable storage means coupled to said comparison means responsive to the output signals of said comparison means for assuming a first state in response to the first output signal of said comparison means and a second state in response to the second output signal of said comparison means, first transfer means coupled to said first and second storage means and to said comparison means for simultaneously transferring the mantissa and exponent of each of said floating-point numbers from said first and second storage means to said comparison means, second transfer means coupled to said first and second storage means and to said bistable storage means for simultaneously receiving at its input terminals binary representations of the mantissas of the first and second floating-point numbers in said first and second storage means respectively, means included in said second transfer means responsive to the state of said bistable storage means for transferring the representation of the mantissa of the smaller floating-point number to said first portion of said first storage means, arithmetic means coupled to said second portion of said first and second storage means and to said second transfer means and providing a binary representation of the difference between the exponents of the first floating-point number and the second floating-point number, and further means included in said second transfer means for transferring the representation of the exponent difference to said second portion of said first storage means.

2. In apparatus for processing floating-point numbers each floating-point number comprising a mantissa and an exponent, the combination comprising: first storage means including a first portion for storing the mantissa and a second portion for storing the exponent of a first floating-point number, second storage means including a first portion for storing the mantissa and a second portion for storing the exponent of a second floating-point number, comparison means for comparing two floating-point numbers and for providing a first output signal if said first floating-point number is the larger and for providing a second output signal if said second floating-point number is the larger, first transfer means for applying said first and said second floating-point numbers to said comparison means, second transfer means including first gating means coupled to said first portion of said first storage means and second gating means coupled to said first portion of said second storage means, said first gating means receiving the mantissa of said first floating-point number from said first portion of said first storage means, said second gating means receiving the mantissa of said second floating-point number from said first portion of said second storage means, logic means coupled to said first and second gating means and to said comparison means, said logic means being responsive to the first output signal of said comparison means for inhibiting said first gating means and for enabling said second gating means and responsive to the second output signal of said comparison means for enabling said first gating means and for inhibiting said second gating means, and third transfer means coupled to said first and second gating means and to said first portion of said first storage means for transferring the outputs of said first and second gating means to said first portion of said first storage means.

3. In apparatus for processing floating-point numbers, each floating-point number comprising a mantissa and an exponent, the combination comprising: first storage means having a first portion for storing the mantissa and a second portion for storing the exponent of a first floating-point number, second storage means having a first portion for storing the mantissa and a second portion for storing the exponent of a second floating-point number, an arithmetic unit for selectively performing an arithmetic operation on pairs of numbers applied thereto and for providing a corresponding output, logic means coupled to said first and second storage means and to said arithmetic unit, said logic means including first transfer means for applying the mantissa of one of said first and second floating-point numbers from said first portion of the corresponding storage means to said arithmetic unit, said logic means further including means for inhibiting the application of the mantissa of the other floating-point number to said arithmetic unit, said first transfer means applying to said arithmetic unit the exponent of each of said first and second floating-point numbers from said second portions of said respective storage means, and second transfer means coupled to said arithmetic unit and said first storage means for transferring the one mantissa applied to said arithmetic unit and the results of the arithmetic operation on the exponents applied to said arithmetic unit from the output of said arithmetic unit to said first and second portions respectively of said first storage means.

4. In apparatus for processing floating-point numbers, each floating-point number comprising a mantissa and an exponent, the combination comprising: first storage means having a first portion for storing the mantissa and a second portion for storing the exponent of a first floating-point number, second storage means having a first portion for storing the mantissa and a second portion for storing the exponent of a second floating-point number, third storage means having a first portion corresponding to a mantissa of a floating-point number containing a first type of binary digit and a second portion corresponding to an exponent of a floating-point number containing a second type of binary digit, an arithmetic unit for selectively performing an arithmetic operation on pairs of numbers applied thereto, first transfer means coupled to said first, second and third storage means and to said arithmetic unit, said first transfer means being responsive to the first type of binary digit in the first portion of said third storage means for applying the mantissa of one of said floating-point numbers from said first portion of the corresponding storage means to said arithmetic unit, second transfer means coupled to said first, second and third storage means and to said arithmetic unit, said second transfer means being responsive to the second type of binary digit in the second portion of said third storage means for applying the exponents in the second portions of said first and second storage means to said arithmetic unit, and third transfer means coupled to said arithmetic unit and to said first storage means for transferring the mantissa applied to said arithmetic unit from the output of said arithmetic unit to the first portion of said first storage means and for transferring the result of the arithmetic operation performed by the arithmetic unit on the exponents of said first and second floating-point numbers to said second portion of said first storage means.

5. In apparatus for processing floating-point numbers, each floating-point number comprising a mantissa and an exponent, the combination comprising: first storage means having a first portion for storing the mantissa and a second portion for storing the exponent of a floating-point number, second storage means having a first portion corresponding to a mantissa of a floating-point number containing a group of binary digits of a first type, said second storage means having a second portion corresponding to an exponent of a floating-point number containing a group of binary digits of a second type, an arithmetic unit for selectively performing an arithmetic operation on numbers applied thereto and for providing a corresponding output, first transfer means coupled to said first and second storage means and to said arithmetic unit for applying the contents of said first and second storage means to said arithmetic unit, control means included in said arithmetic unit responsive to the group of binary digits of the first type from said second storage means for inhibiting performance of an arithmetic operation by said arithmetic unit on the mantissa of said floating-point number from said first storage means, said control means being responsive to the group of binary digits of the second type from said second storage means for enabling the performance of an arithmetic operation by said arithmetic unit on the exponent of said floating-point number from said first storage means, and second transfer means coupled to said arithmetic unit and to said first storage means for transferring the output of said arithmetic unit to said first storage means.

6. In apparatus for processing floating-point numbers, each floating-point number comprising a mantissa and an exponent, the combination comprising: first storage means having a first portion for storing the mantissa and a second portion for storing the exponent of a first floating-point number, second storage means having a first portion for storing the mantissa and a second portion for storing the exponent of a second floating-point number, third storage means having a first portion containing a group of binary digits of a first type corresponding to a mantissa of a floating-point number and having a second portion containing a group of binary digits of a second type corresponding to an exponent of a floating-point number, comparison means responsive to first and second floating-point numbers applied thereto for providing a first output signal if the first floating point number is the larger and for providing a second output signal if the second floating-point number is the larger, first transfer means coupled to said first and second storage means and to said comparison means for simultaneously applying said first and second floating-point numbers in said first and second storage means respectively to said comparison means, an arithmetic unit for selectively performing an arithmetic operation on pairs of numbers applied thereto, second transfer means coupled to said first and second storage means and to said comparison means for simultaneously applying said first and second floating-point numbers in said first and second storage means respectively to said arithmetic unit, control means coupled to said third storage means, to said comparison means and to said arithmetic unit, said control means being responsive to the group of binary digits of the first type in said third storage means and to the first output signal of said comparison means for inhibiting the performance of the arithmetic operation by said arithmetic unit and for causing said arithmetic unit to provide at its output the mantissa of said second floating-point number, said control means being responsive to the group of binary digits of said first type in said third storage means and to said second output signal of said comparison means for inhibiting the performance of the arithmetic operation by said arithmetic unit and for causing said arithmetic unit to provide at its output the mantissa of said first floating-point number, said control means being responsive to the group of binary digits of said second type in said third storage means for causing said arithmetic unit to perform the arithmetic operation on the exponents of said first and second floating-point numbers and to provide at its output the result of the arithmetic operation, and third transfer means coupled to said arithmetic unit and to said first storage means for transferring the output of said arithmetic unit to said first storage means.

References Cited

UNITED STATES PATENTS

| | | | |
|---|---|---|---|
| 3,131,293 | 4/1964 | Bush et al. | 235—156 |
| 3,037,701 | 6/1962 | Sierra | 235—159 |
| 3,319,228 | 5/1967 | Apple | 340—172.5 |
| 3,304,417 | 2/1967 | Hertz | 235—164 |
| 3,254,204 | 5/1966 | Merner | 235—160 |

OTHER REFERENCES

F. B. Jones and A. W. Wymore: Floating Point Feature on the IBM Type 1620, IBM Technical Disclosure Bulletin, May 1962, pp. 43–46.

EUGENE G. BOTZ, Primary Examiner

D. H. MALZAHN, Assistant Examiner

U.S. Cl. X.R.

235—156; 340—172.5